(12) United States Patent
Tsuda

(10) Patent No.: US 11,213,971 B2
(45) Date of Patent: Jan. 4, 2022

(54) ADJUSTABLE BLADE GUARD WITH DUST COLLECTION

(71) Applicant: SawStop Holding LLC, Tualatin, OR (US)

(72) Inventor: Hollan A. Tsuda, Corvallis, OR (US)

(73) Assignee: SawStop Holding LLC, Tualatin, OR (US)

( * ) Notice: Subject to any disclaimer, the term of this patent is extended or adjusted under 35 U.S.C. 154(b) by 0 days.

(21) Appl. No.: 16/829,749

(22) Filed: Mar. 25, 2020

(65) Prior Publication Data
US 2020/0307016 A1    Oct. 1, 2020

Related U.S. Application Data

(60) Provisional application No. 62/824,754, filed on Mar. 27, 2019.

(51) Int. Cl.
*B27G 19/02* (2006.01)
*B27B 5/20* (2006.01)

(52) U.S. Cl.
CPC .............. *B27G 19/02* (2013.01); *B27B 5/20* (2013.01)

(58) Field of Classification Search
CPC ........ B27G 19/02; B27G 19/08; B27G 19/10; B27B 5/20; B27B 3/28; B27B 5/06; B27B 5/29; B23D 59/006; B23D 47/04; B23D 59/005; B23B 5/243; Y10T 83/773; Y10T 83/732; Y10T 83/7734; Y10T 83/7726; Y10T 83/96; Y10T 83/01

USPC ..... 83/397.1, 477.2, 440.2, 162, 157, 102.1, 83/478, 544, 520, 581, 477; 144/251.1, 144/251.3, 286.5, 287, 253.3
See application file for complete search history.

(56) References Cited

U.S. PATENT DOCUMENTS

| | | | | |
|---|---|---|---|---|
| 2,352,235 | A | * 6/1944 | Tautz | B27G 19/02 83/102.1 |
| 5,875,698 | A | * 3/1999 | Ceroll | B23D 45/067 83/473 |
| 6,796,208 | B1 | * 9/2004 | Jorgensen | B23D 59/006 83/100 |
| 8,079,295 | B2 | 12/2011 | Gass | |
| 8,646,369 | B2 | 2/2014 | Gass et al. | |
| 9,586,335 | B2 | * 3/2017 | Tsuda | B27G 19/02 |
| 10,967,536 | B2 | 4/2021 | Gass et al. | |
| 2005/0166736 | A1 | * 8/2005 | Gass | B23D 45/067 83/477.2 |
| 2012/0216665 | A1 | * 8/2012 | Gass | B27B 5/29 83/440.2 |

* cited by examiner

*Primary Examiner* — Ghassem Alie

(57) ABSTRACT

Blade guards for power tools such as table saws are disclosed. The blade guard may include a guard that pivots up and down to allow a workpiece to move past the guard, a dust collection channel, and a pivot mechanism which maintains the dust collection channel in an operable condition as the guard pivots up or down. The guard may also function as a wood stop and it may include anti-kickback pawls. The blade guard may be part of a dust collection system and may be connected to a vacuum system by a conduit such as a flexible hose.

6 Claims, 21 Drawing Sheets

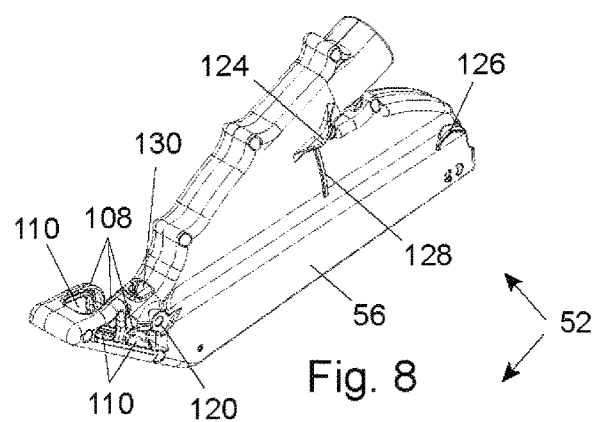
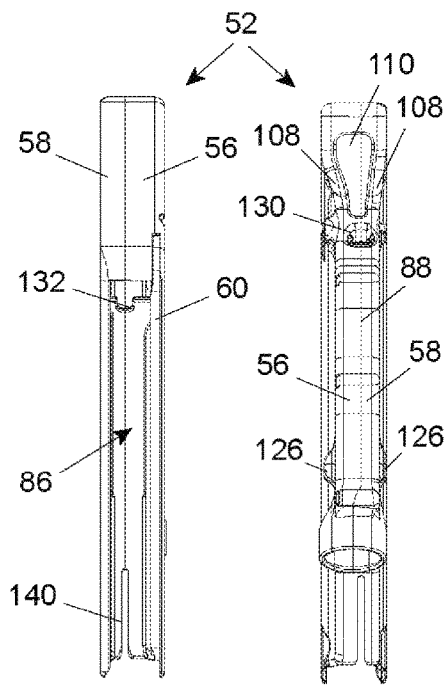
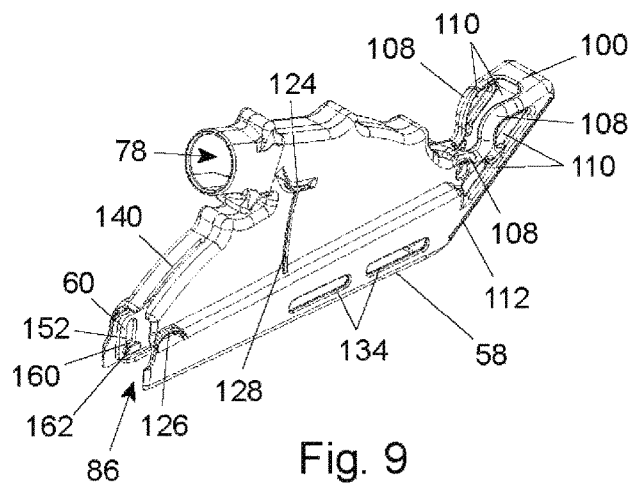
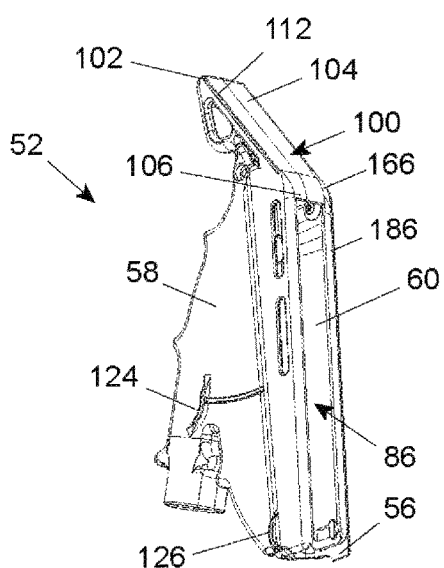
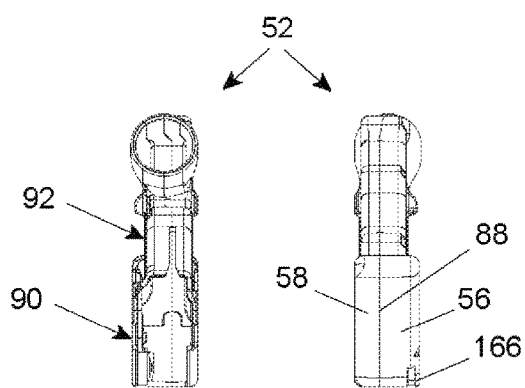

Fig. 19
Fig. 20
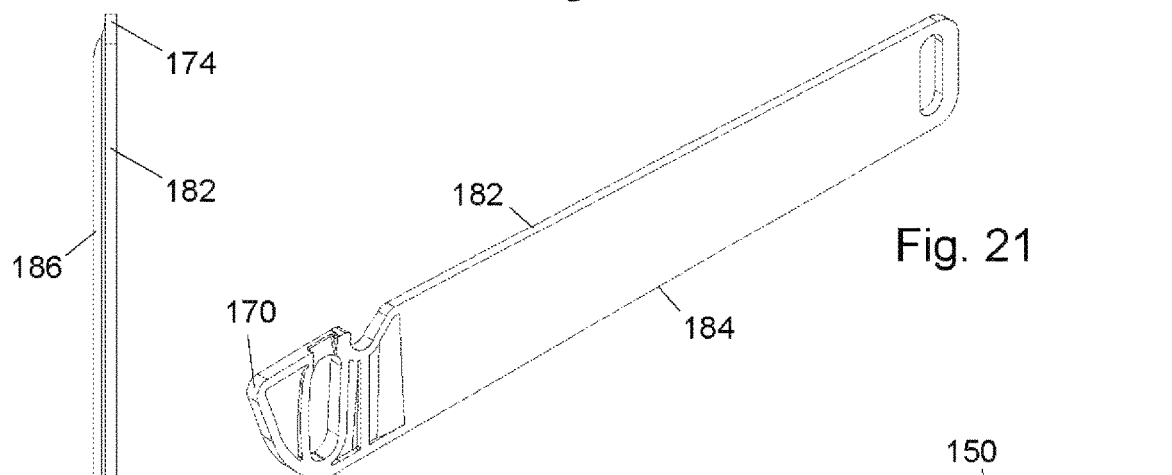
Fig. 21
Fig. 22
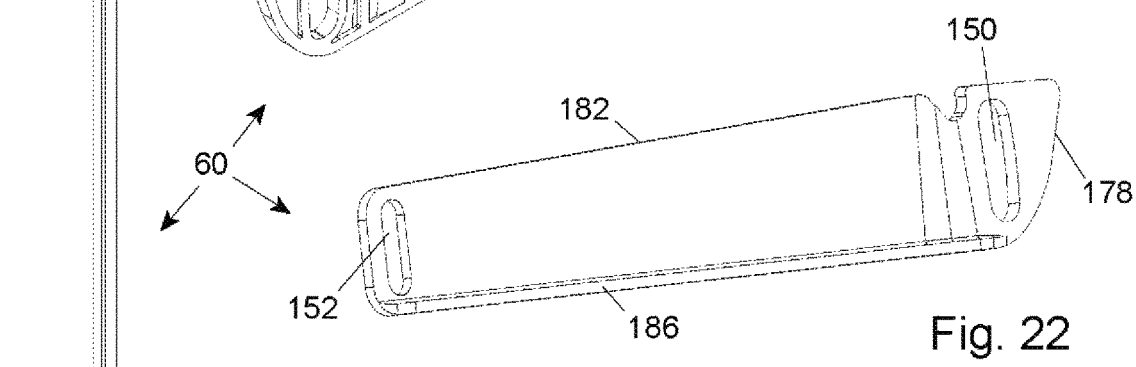
Fig. 23
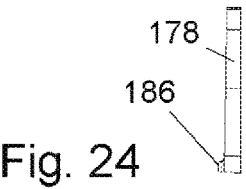
Fig. 24
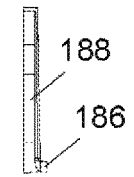
Fig. 25

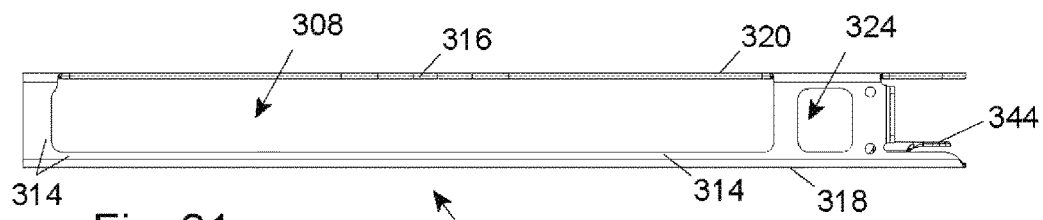
Fig. 31
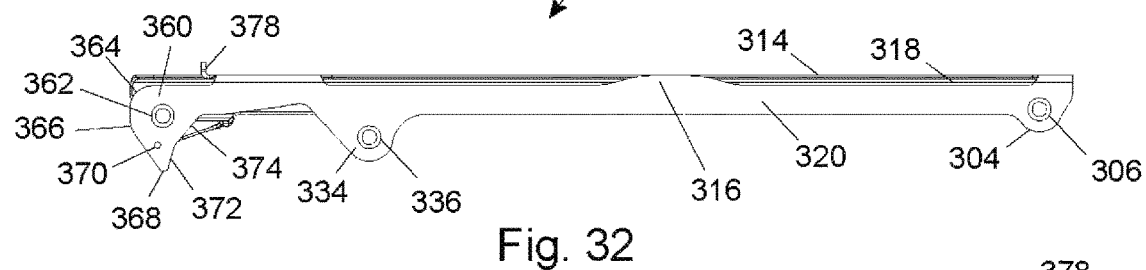
Fig. 32
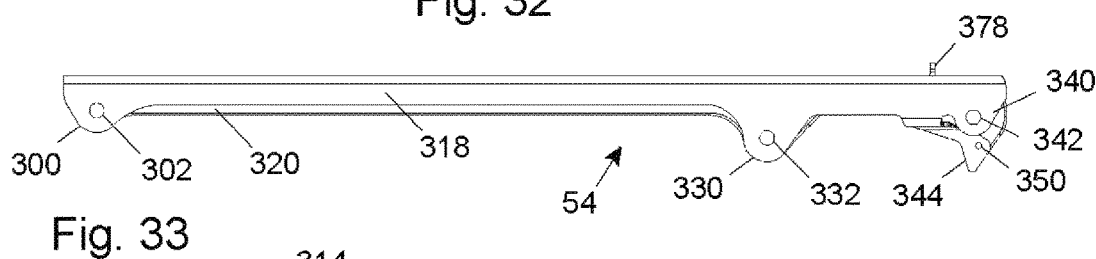
Fig. 33
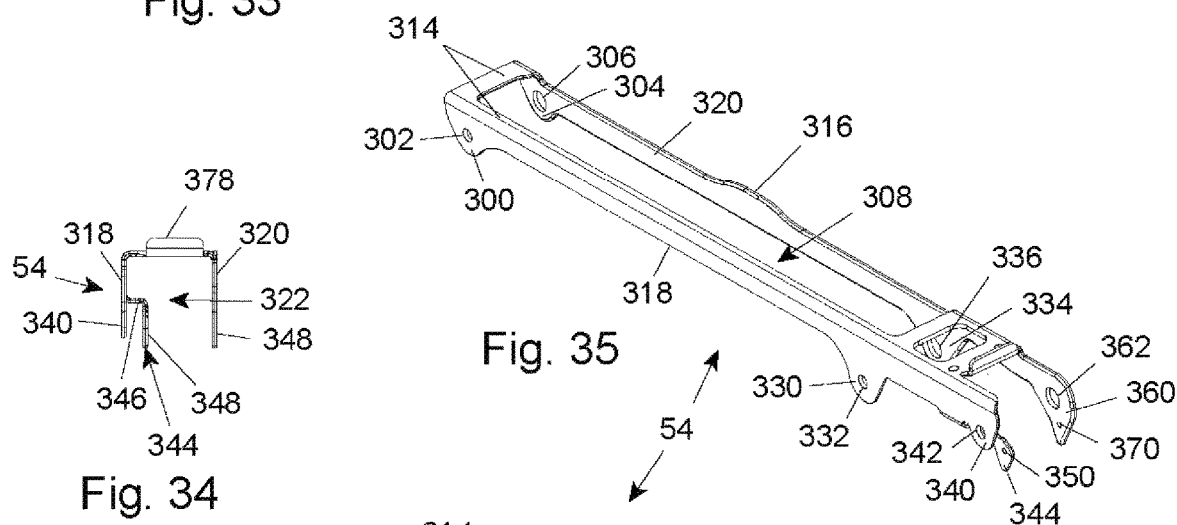
Fig. 34
Fig. 35
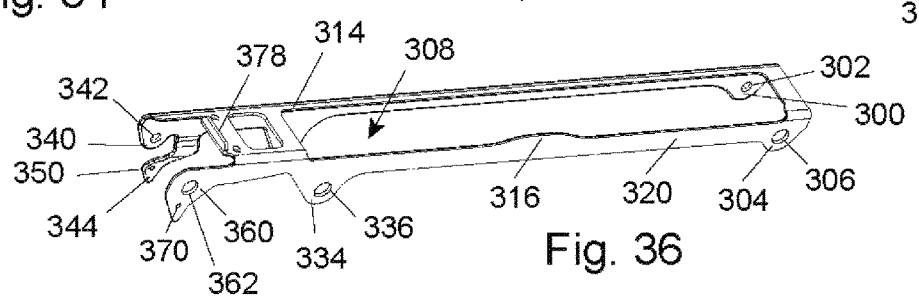
Fig. 36

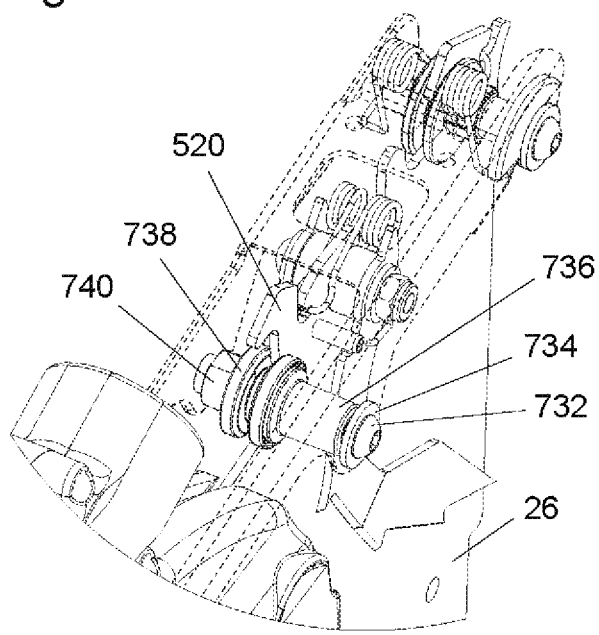
Fig. 65
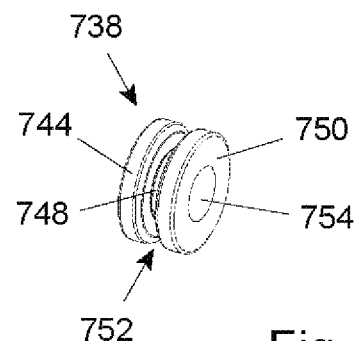
Fig. 66
Fig. 67
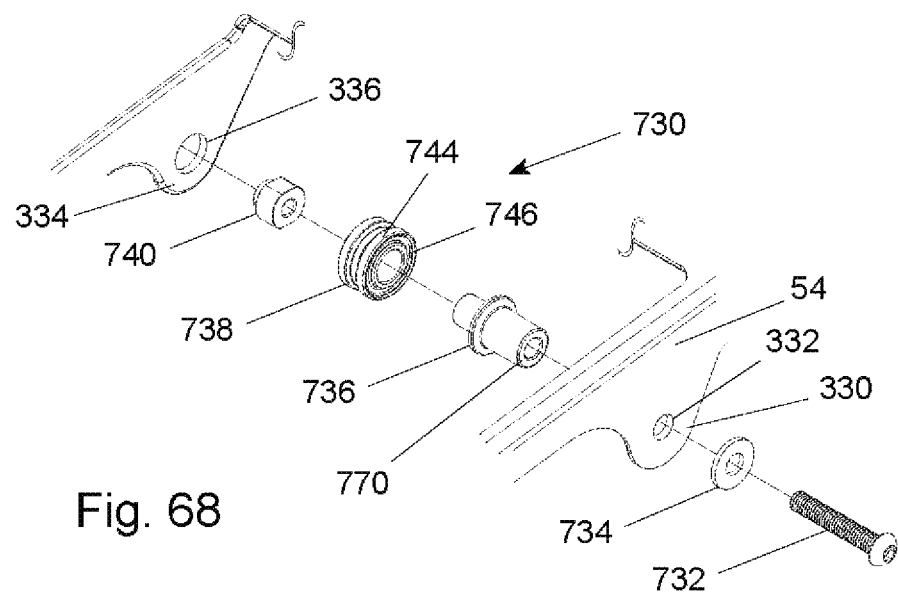
Fig. 68

ADJUSTABLE BLADE GUARD WITH DUST COLLECTION

CROSS-REFERENCE TO RELATED APPLICATION

This application claims the benefit of and priority from U.S. Provisional Patent Application Ser. No. 62/824,754, filed Mar. 27, 2019, which is incorporated herein by reference.

FIELD

The present disclosure relates to blade guards for power tools such as table saws. More specifically, the disclosure relates to blade guards with dust collection systems, splitters, and anti-kickback devices.

BACKGROUND

A table saw is a power tool used to cut a work piece to a desired size or shape. A table saw includes a work surface or table and a circular blade extending up through the table. A person uses a table saw by holding a workpiece on the table and feeding it past the spinning blade to make a cut. However, a significant amount of sawdust is generated at the surface of a table saw as the blade cuts a workpiece, and that dust can disperse into the surrounding environment. Dust from wood and many other products commonly processed in a workshop environment has been shown to pose a health risk to those who are exposed to the dust, especially if they are exposed to the dust on a regular basis. Thus, it is useful to collect as much dust as possible at the time of cutting and thereby limit the dust that escapes into the environment.

Some table saws include a spreader or splitter, which is a flat plate, similar to a riving knife, but typically extending above the top of the blade so that a blade guard can be mounted thereto. The splitter helps to keep a workpiece from shifting sideways and catching on the blade. An anti-kickback device such as anti-kickback pawls, which are toothed pawls positioned to oppose a work piece being thrown back toward a user, are often mounted on the splitter. The blade of a table saw presents a risk of injury to a user of the saw. The disclosed blade guards include a guard to substantially enclose the blade and protect a user against contact with the blade.

In some configurations, the blade guards provide a block to prevent workpieces from contacting the blade if the work pieces are too high or thick to freely pass under the anti-kickback pawls or under any other structure associated with the blade guard and/or splitter.

BRIEF DESCRIPTION OF THE DRAWINGS

FIG. 8 shows a perspective view of the shroud of the blade guard.
FIG. 9 shows another perspective view of the shroud.
FIG. 10 shows a bottom view of the shroud.
FIG. 11 shows a top view of the shroud.
FIG. 12 shows a back view of the shroud.
FIG. 13 shows a front view of the shroud.
FIG. 14 shows another perspective view of the shroud.
FIG. 19 shows a side view of the side extension.
FIG. 20 shows another side view of the side extension.
FIG. 21 shows a perspective view of the side extension.
FIG. 22 shows another perspective view of the side extension.
FIG. 23 shows a top view of the side extension.
FIG. 24 shows a front view of the side extension.
FIG. 25 shows a rear view of the side extension.
FIG. 31 shows a top view of the support arm.
FIG. 32 shows a side view of the support arm.
FIG. 33 shows another side view of the support arm.
FIG. 34 shows a back view of the support arm.
FIG. 35 shows a perspective view of the support arm.
FIG. 36 shows another perspective view of the support arm.

FIG. 65 shows a perspective view of an alternate lateral adjustment mechanism installed on a splitter.

FIG. 66 shows an axle.

FIG. 67 shows a guide.

FIG. 68 shows a sectional, exploded view of the alternate lateral adjustment mechanism of FIG. 65.

DETAILED DESCRIPTION

Figure 1:
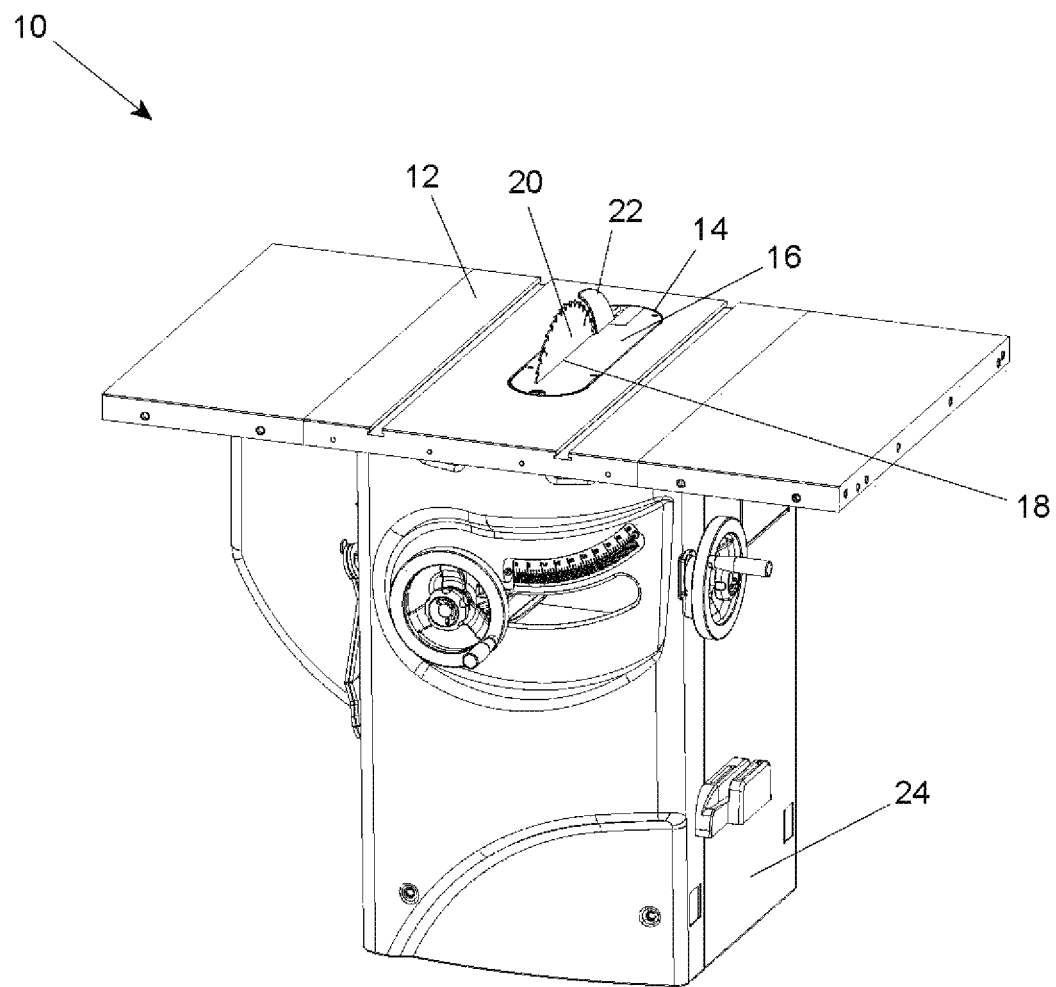
FIG. 1 shows a table saw.

FIG. 1 shows a table saw 10 with a table 12, an opening 14, and an insert 16 in the opening. A nominally planar, circular blade 20 extends up through a slot 18 in the insert, and a riving knife 22 extends up behind the blade. A housing 24 supports the table and a motor 25 (shown in FIG. 74) is within the housing. The motor is operably connected to the blade to drive or spin the blade relative to the work surface. To use the table saw, a user places a work piece on the table and slides it into contact with the spinning blade to make a cut. The blade has a radius, which can be approximately 5 inches, and has teeth disposed about its periphery.

The blade in a table saw is typically supported in such a way that a user can change the elevation and tilt of the blade relative to the table to cut material of various thicknesses and to make angled cuts. This can be accomplished in a variety of ways, some of which are outlined in at least U.S. Pat. No. 7,707,920, titled "Table Saws With Safety Systems," U.S. Pat. No. 9,981,326, titled "Table Saw," and U.S. Pat. No. 9,555,491, titled "Blade Elevation Mechanisms And Anti-Backdrive Mechanisms For Table Saws," which are all incorporated herein by reference. The blade may be thought of as having a cutting region comprising the front portion of the blade which extends up above the work surface. The blade is nominally planar, having two opposed faces, and it has an adjustable orientation relative to the work surface.

Figure 2:
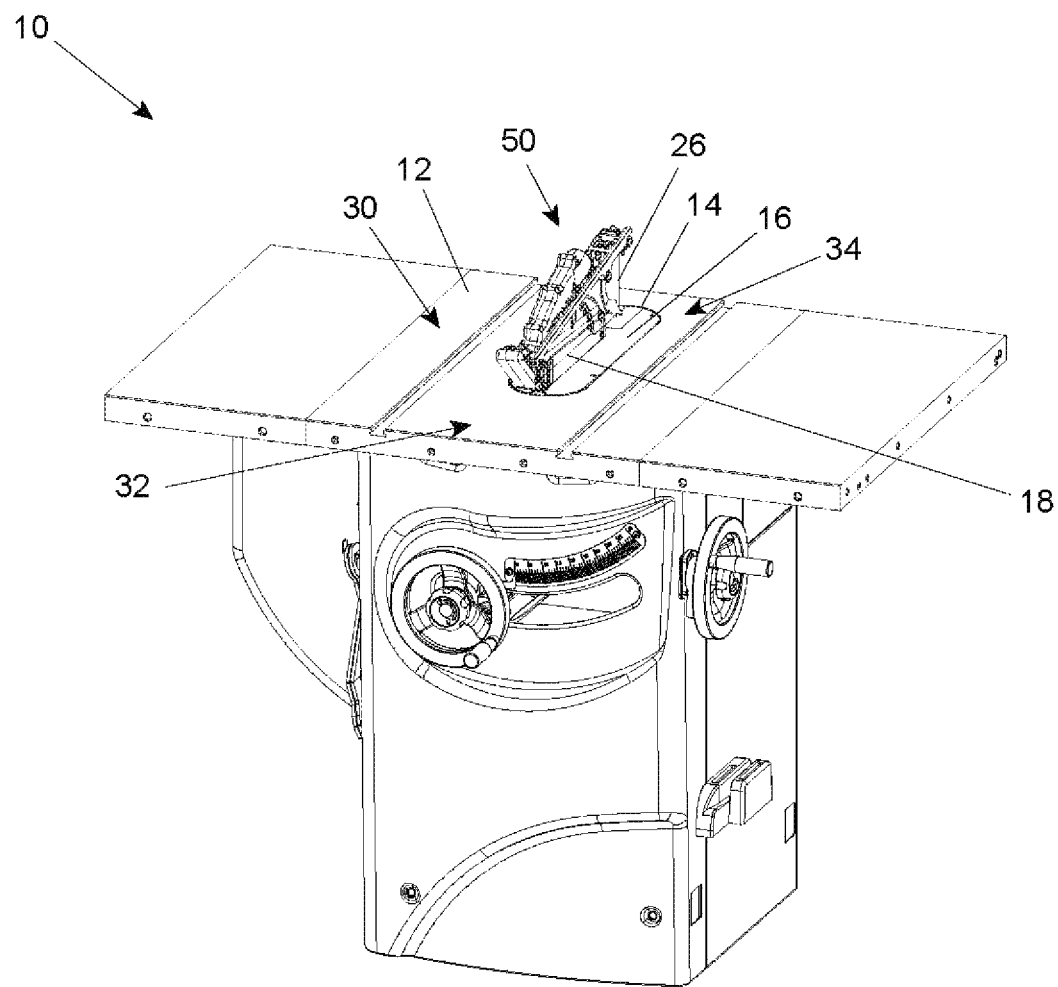
FIG. 2 shows the table saw of FIG. 1 equipped with a blade guard.

In FIG. 2, table saw 10 is shown with a work surface 30 that includes an infeed region 32 and an outfeed region 34. The infeed region refers generally to the portion of the work surface that a work piece rests upon as the work piece is moved into contact with the spinning blade (or other cutting tool), and the outfeed region refers generally to the portion of the work surface that the work piece rests upon after it has been cut by the blade.

Figure 74:
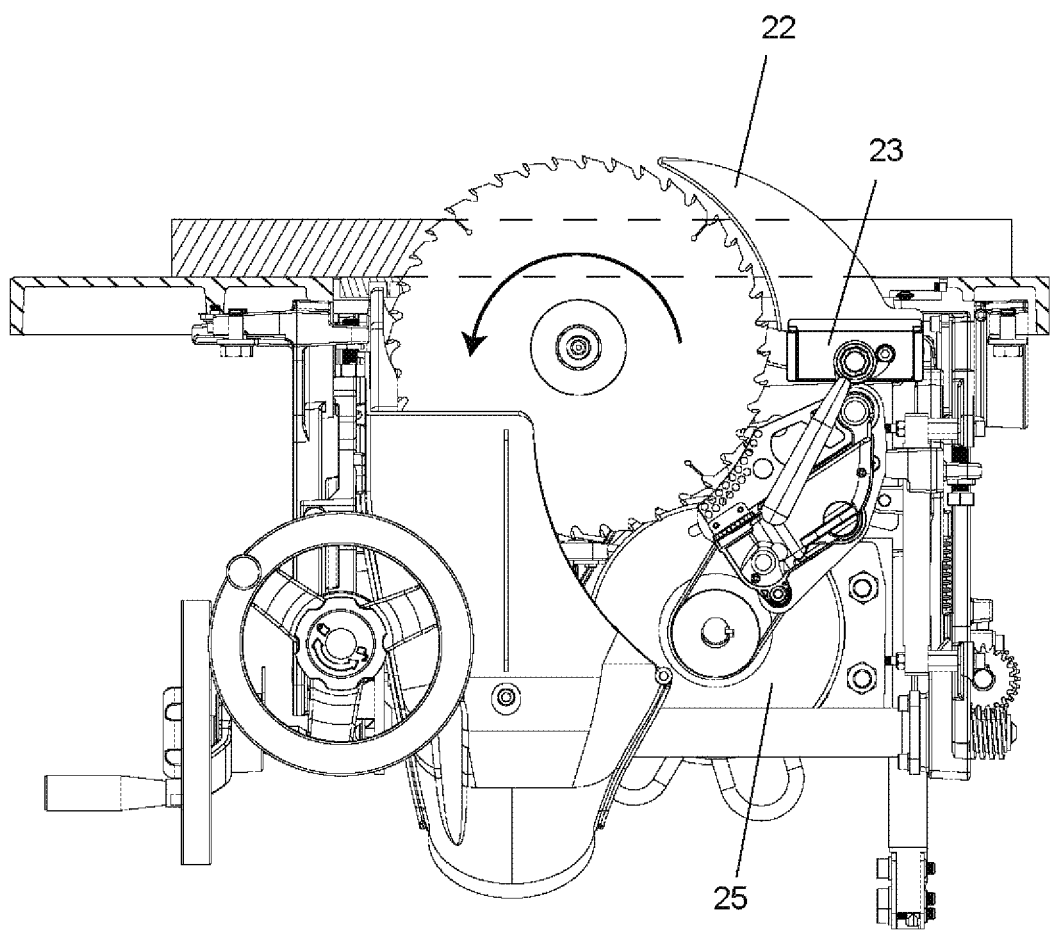
FIG. 74 shows a sectional, internal, side view of a table saw with some components removed for clarity.

A blade guard, splitter, and/or riving knife may be positioned adjacent the rear edge of the blade to shield the blade and/or to prevent a work piece from catching the rear of the blade. FIG. 2 shows a splitter 26 supported by the internal mechanisms of saw 10, and which raises, lowers, and tilts along with the blade in order to maintain a constant position relative thereto. The blade and splitter extend through opening 14 in table 12 from below the table to an elevation above the table. Various mechanisms for mounting a splitter and/or riving knife in a saw are described in U.S. Pat. No. 7,827,890, titled "Table Saws With Safety Systems And Systems To Mount And Index Attachments" and U.S. Pat. No. 10,118,308 titled "Systems To Mount And Index Riving Knives And Spreaders In Table Saws," both of which are incorporated herein by reference. FIG. 74 shows an exemplary mounting mechanism 23.

FIGS. 2-5 show the saw of FIG. 1 with a splitter 26 and a blade guard assembly 50 installed. One of the purposes of the blade guard is to protect the user of the saw from coming into contact with the spinning blade by providing a physical barrier to block the user's hand from moving into the blade. It is an accessory used for through-sawing, i.e., where the blade cuts through the top of a work piece, such as work piece 28 shown in FIG. 4. Another purpose of the blade guard is to facilitate collection of the dust produced during the cutting of a work piece, as will be discussed.

Figure 3:
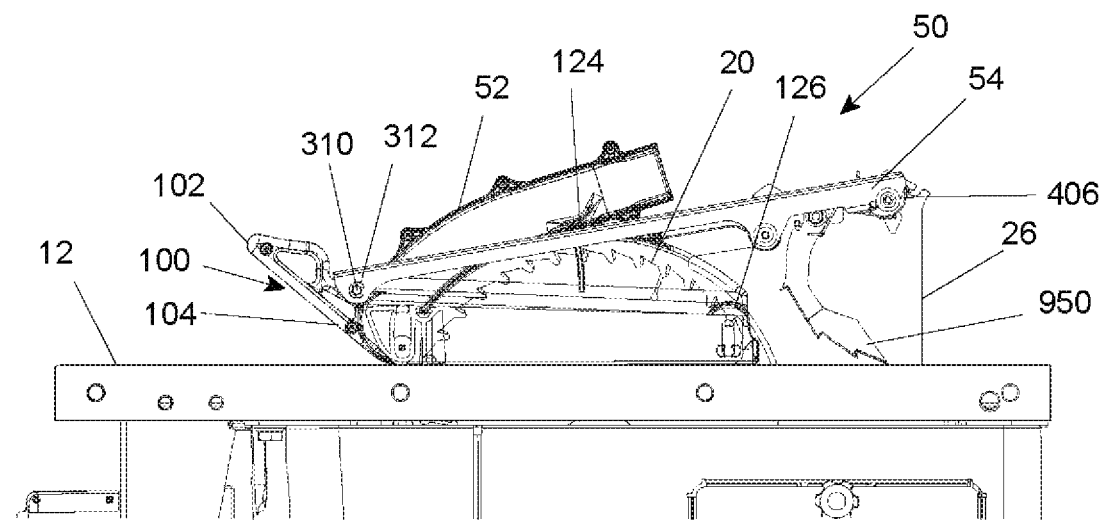
FIG. 3 shows a side view of the blade guard of FIG. 2 installed in the table saw of FIG. 1 with the blade elevated.
Figure 4:
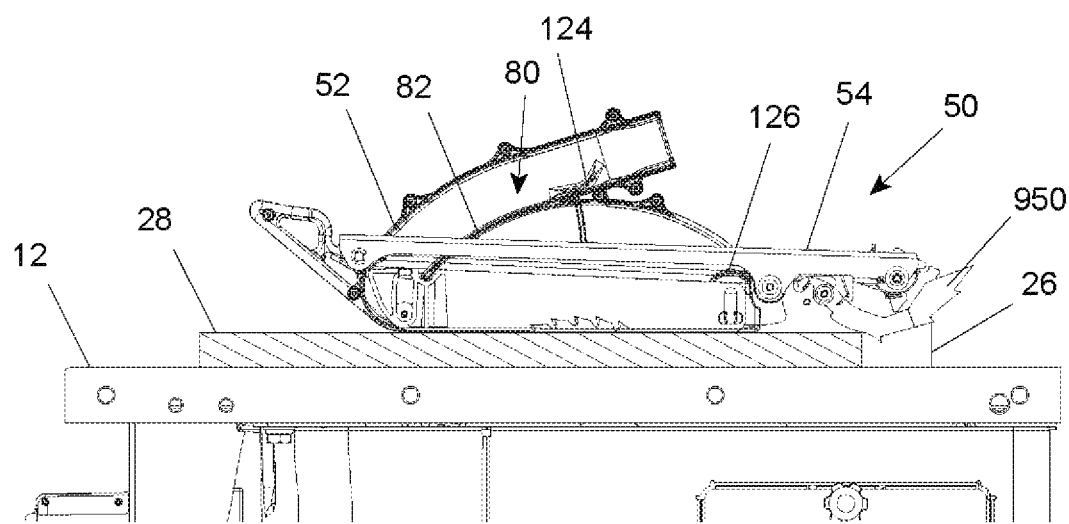
FIG. 4 shows a side view of the blade guard of FIG. 2 installed in the table saw of FIG. 1 with the blade partially lowered.
Figure 5:
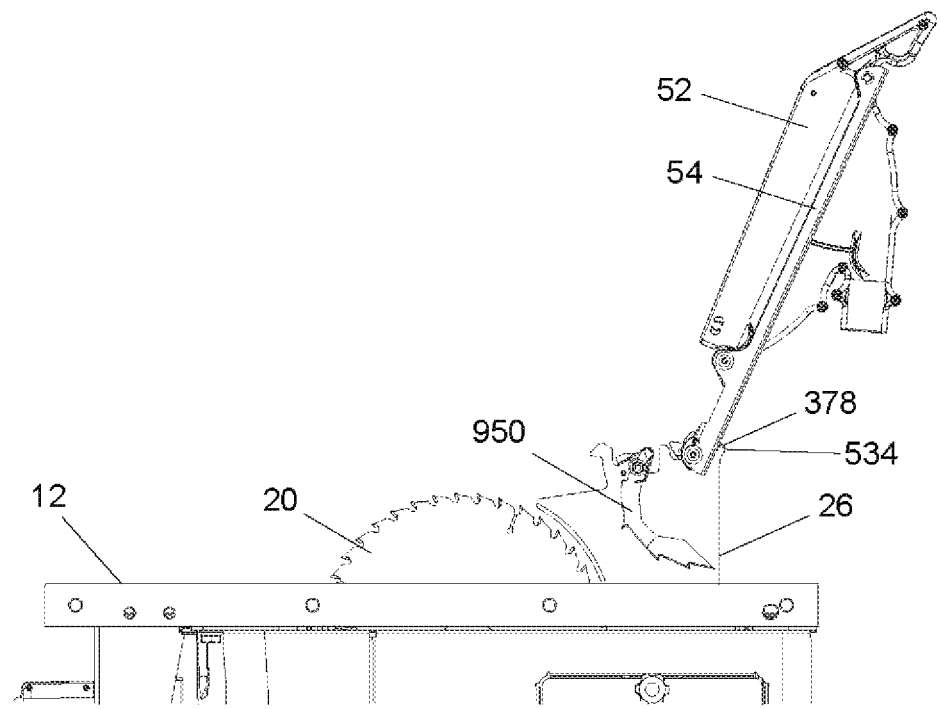
FIG. 5 shows a side view of the blade guard installed in the table saw of FIG. 1 with the blade guard assembly pivoted to an upright position.
Figure 6:
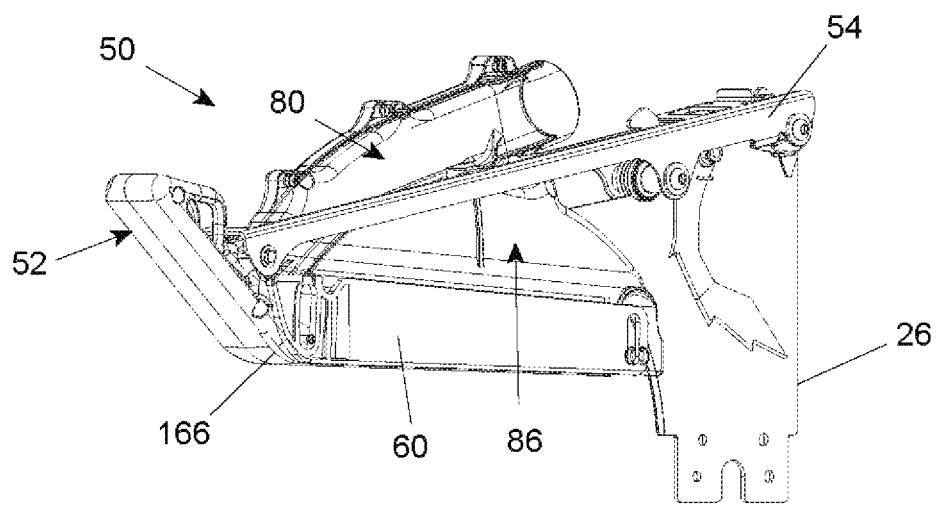
FIG. 6 shows a perspective view of the blade guard assembly of FIG. 2 installed on a splitter.
Figure 7:
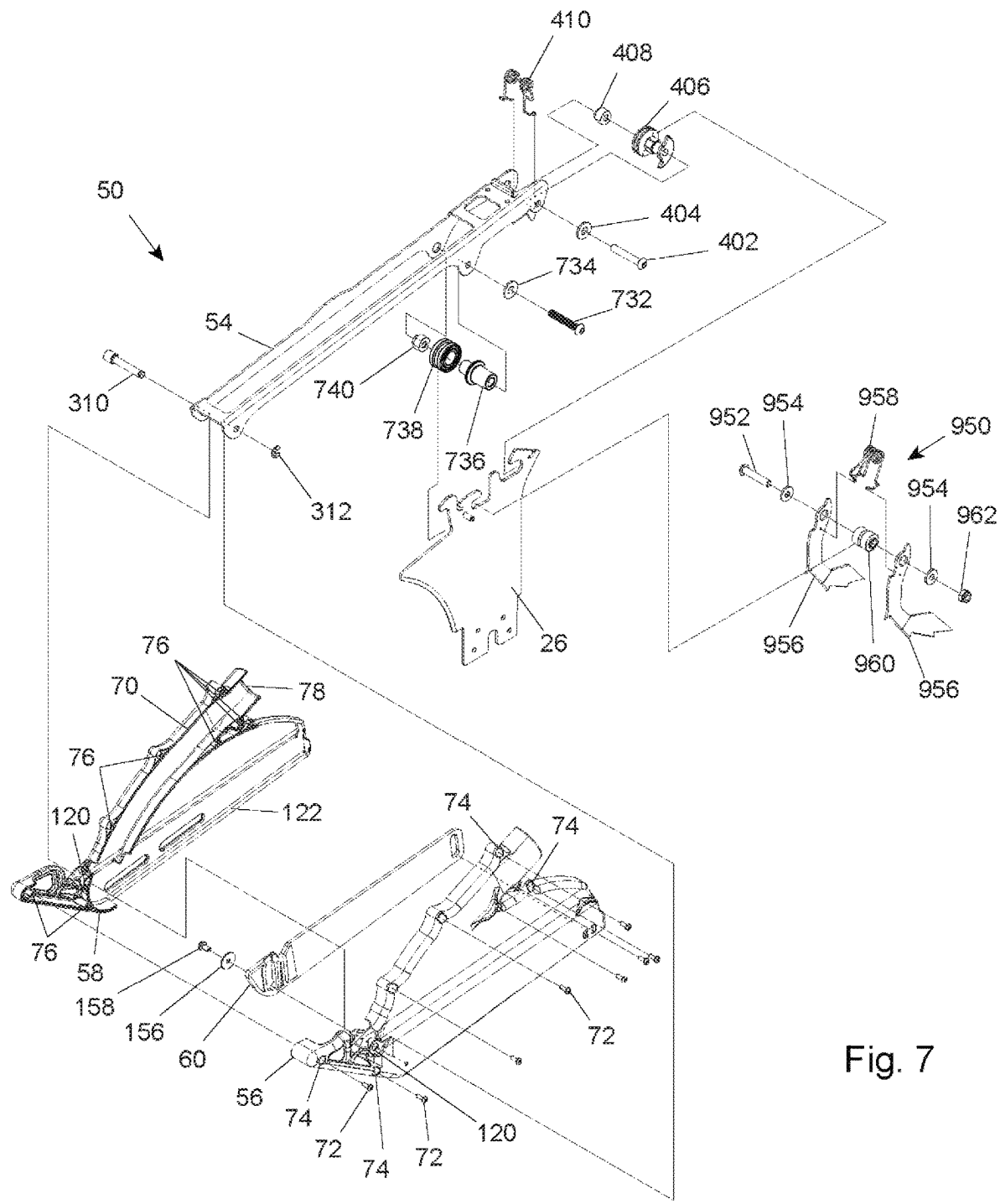
FIG. 7 shows an exploded view of the blade guard assembly and a splitter.

Blade guard assembly 50 and splitter 26 are shown isolated in FIG. 6. FIG. 7 shows an exploded view of the blade guard assembly and splitter. The assembly may also be thought of as a blade guard, and it consists of a shroud or lateral guard 52 that surrounds the blade and a support arm 54 to which the shroud is attached. The arm is pivotally attached to the splitter 26. When shroud 52 is in use, the bottom of the shroud rests on table insert 16 or a work piece 28, as shown in FIGS. 3 and 4, respectively, and it covers the top and sides of the blade. When not in use, the blade guard assembly may be pivoted to an upright position to allow easy access to the blade and other internal saw components, as shown in FIG. 5. The assembly may also include vertical and lateral guide assemblies and an anti-kickback assembly, all of which will be discussed later.

As shown in FIGS. 8-14, shroud 52 is composed of right and left shells 56 and 58, respectively, and a side extension 60. These components are typically made from a nonconductive material such as polycarbonate or some other plastic so that the guard will not affect any electrical signal on the blade if the guard comes into contact with the blade and if the saw includes a contact detection system as described in U.S. Pat. No. 9,724,840 titled "Safety Systems for Power Equipment," which is incorporated herein by reference. The material of the guard should also be sufficiently soft so that it will be unlikely to damage the blade if the guard comes into contact with the blade. Often, the blade guard components are made of a transparent plastic so that the blade can be seen through the guard. The right and left shells cover the top, front, and sides of the blade during normal use, and the side extension provides additional coverage along the right side of the blade when the blade is tilted.

FIG. 7 shows an exploded view of blade guard assembly 50, as well as splitter 26 and an anti-kickback assembly 950. The right and left shells fit together with tongue and groove mating 70 along their joining edges, and they are fastened together with eight small, self-threading screws 72 (labeled in FIGS. 7 and 15). Each screw passes through a boss 74 in right shell 56, which catches the head of the screw at the bottom of the boss, and then threads into a boss 76 in left shell 58. Three of the screws are spread out along the length of the top surface of the guard, three screws are positioned just below a dust port 78, one at the base of a nose 100, and one at the tip of the nose. The right and left shells could also be joined together by nuts and bolts, sonic welding, adhesive, clips, or some other method, or shroud 52 could be a single molded piece. When connected, the right and left shells form a cavity 86 in which blade 20 may spin, and within which side extension 60 may move.

Figure 15:
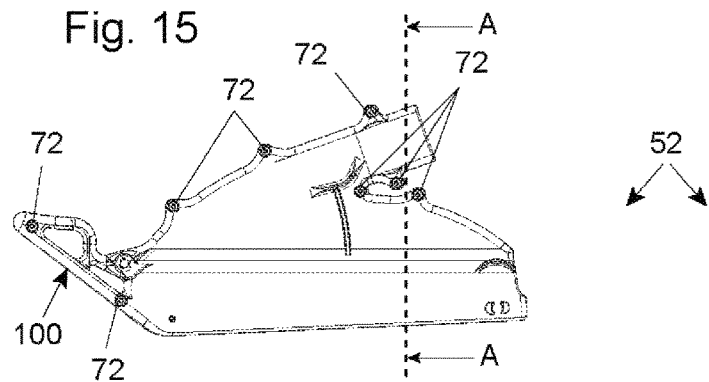
FIG. 15 shows a side view of the shroud.
Figure 16:
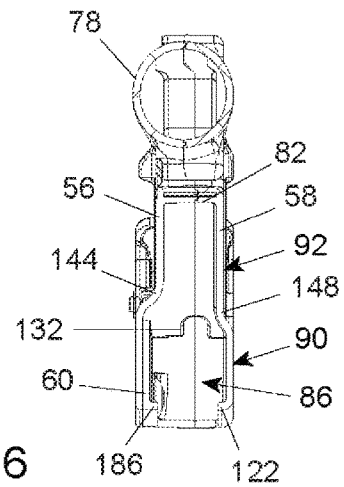
FIG. 16 shows a sectional view of the shroud, taken along the line A-A in FIG. 15.
Figure 17:
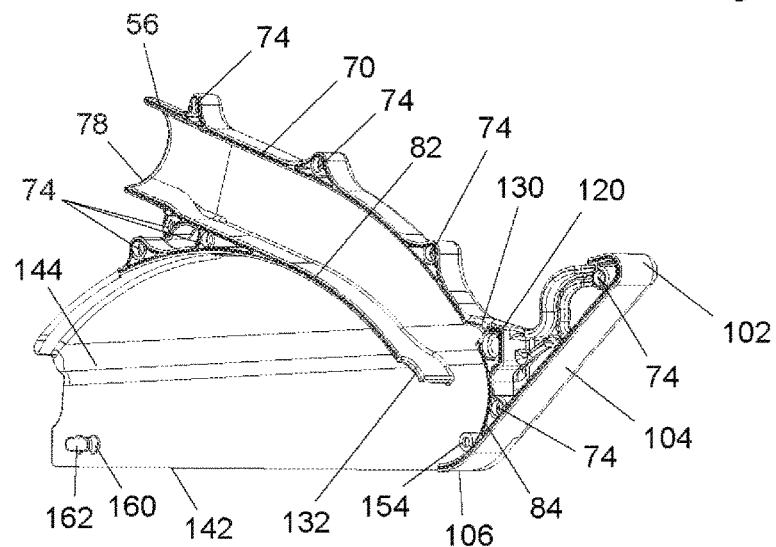
FIG. 17 shows a perspective view of the right shell of the shroud.
Figure 18:
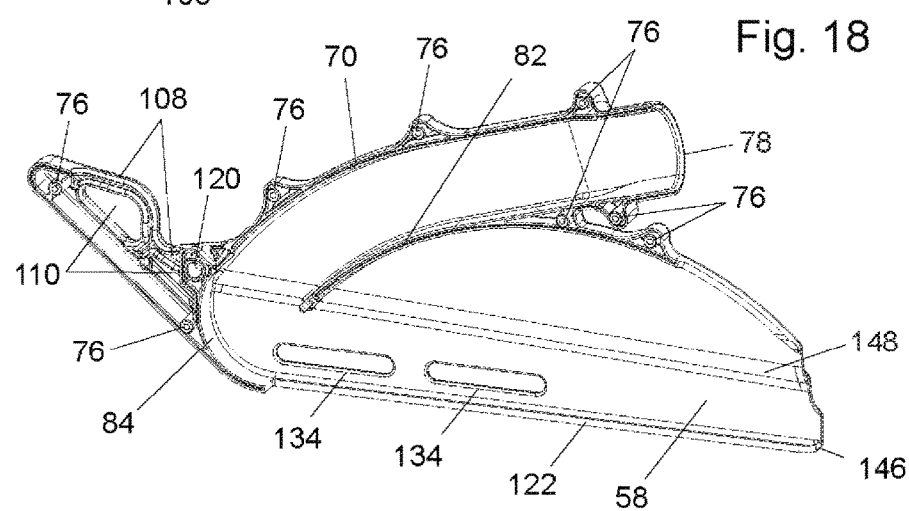
FIG. 18 shows a perspective view of the left shell of the shroud.

FIGS. 8-14 show various views of shroud 52 isolated from other structures, FIG. 15 shows shroud 52 from the right side, FIG. 16 shows a cross-section of the shroud along the line A-A in FIG. 15, FIG. 17 shows right shell 56 isolated, FIG. 18 shows left shell 58 isolated, and FIGS. 19-25 show side extension 60 isolated. Cavity 86 includes a top edge, formed by a divider wall 82 (labeled in FIGS. 4, 17, and 18), which extends inward from each of the right and left shells and mates in the middle with tongue and groove edges. The spacing between the perimeter of the blade, when it is fully elevated, and the divider wall can be approximately ¼ to ½ inch, although other spacings are possible. The top edge of cavity 86 closely follows the curve of the blade, when the blade is fully elevated, in order to minimize the size of the guard and to create a substantially smooth and curved inside surface for dust collection.

Figure 38:
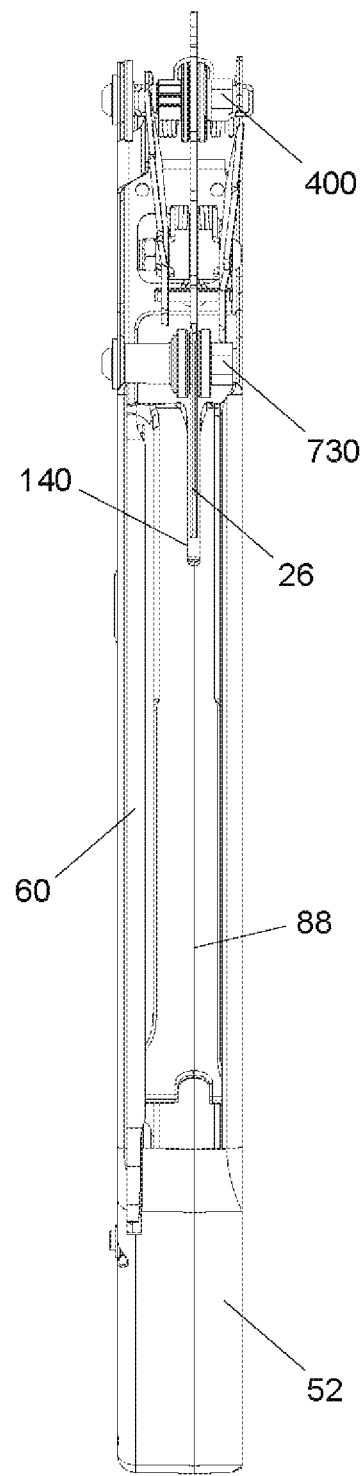
FIG. 38 shows a bottom view of the blade guard assembly installed on a splitter.
Figure 39:
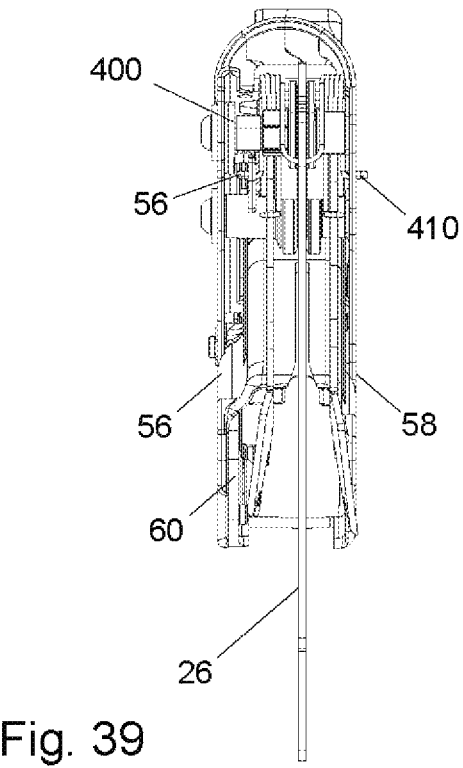
FIG. 39 shows a back view of the blade guard assembly installed on a splitter.
Figure 40:
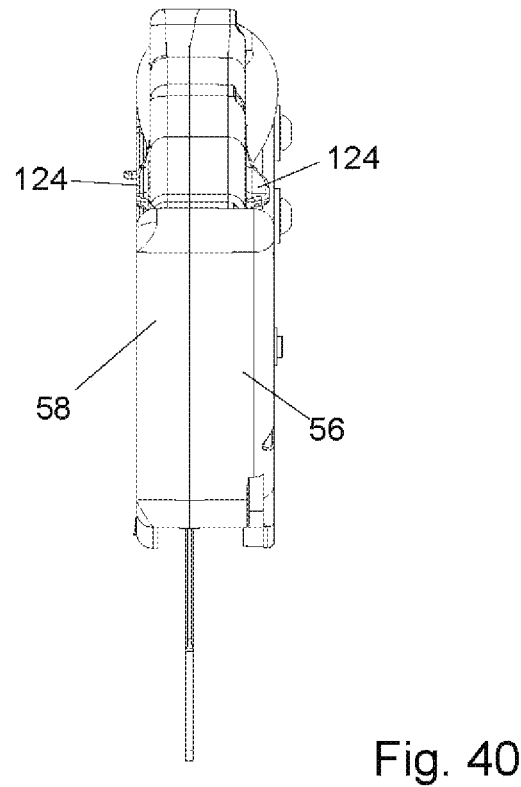
FIG. 40 shows a front view of the blade guard assembly installed on a splitter.

Shroud 52 is also configured to fit closely to the sides of the blade, as shown in at least FIGS. 38 and 39, which show bottom and rear views, respectively, of blade guard assembly 50 installed on splitter 26. The spacing between the sides of the shroud and the blade can be approximately ¼ to ⅘ inch. It will be appreciated that the inside spacing between the sides of the shroud and the blade could vary from approximately ⅛ inch at the closest point to approximately 1 inch or more at the widest point. It will be appreciated that such variation in width could occur front-to-back and/or top-to-bottom, although the presently disclosed invention only includes such variation along the height of the shroud.

It can be seen in FIGS. 12 and 16 that cavity 86 in shroud 52 is wider near the base of the guard, but the cavity narrows as it approaches divider wall 82. FIG. 16 shows a cross-sectional view of shroud 52, taken along the line A-A in FIG. 15, from the rear of the shroud. The shroud 52 may be thought of as having a wide section 90 and a narrow section 92, with a contour 144 in right shell 56 and a contour 148 in left shell 58 forming the transition between the wide and narrow sections. In the presently disclosed embodiment of blade guard assembly 50, shroud 52 fits within an opening in support arm 54, as will be discussed later in greater detail. The width of that opening in the support arm dictates the width of the narrow section 92. However, the shroud must also accommodate side extension 60, and inwardly projecting flanges 122 and 186, which will be discussed later. These features all extend inward from the sides of the shroud toward the blade, so clearance must be provided between the features and the blade. It can be clearly seen in FIG. 16 that right shell 56 is wider in the area where the side extension 60 resides, which allows the side extension, and its flange 186, to be kept away from the blade while maintaining a substantially flat side wall within the right shell when the side extension is within the shroud. Left shell 58 does not change as substantially along the height of the shroud, since it only has to provide clearance for flange 122.

As can be seen in at least FIGS. 10 and 13, right shell 56 is wider than left shell 58. The line 88 formed by the connection between the shells provides a visual indication to a user of the location of the blade within the shroud. The shroud can be configured to position one side thereof closer to the blade, in order to facilitate the use of a rip fence on that side when making narrow cuts. However, it will be appreciated that shroud 52 could also be configured with the two halves of equal width, with the blade centered in the shroud, or with the blade offset toward the right side of the shroud instead of the left side.

A front portion 100 of the shroud extends up and out from the rest of the shroud, as seen in at least FIGS. 3 and 15, and may be thought of as a nose or horn. The nose 100 is shaped in such a way that a work piece can easily slide under the nose and raise the shroud (and the rest of the blade guard assembly) it slides under the shroud. The nose includes a tip 102 and a contact surface 104 that slopes down from the tip toward the blade at an angle, as shown in FIGS. 3 and 17. Nose 100 is sized to accommodate the maximum cutting depth of the saw, which, for example is often 3.125 inches. In other words, the nose is sized so that the thickest work piece that can be cut on the saw will abut the contact surface 104 and push the shroud up so it can rest on top of the work piece as the work piece is advanced toward the blade. Nose 100 can also be sized to accommodate a height just under the maximum cutting depth (i.e. ⅜ of an inch or 10 mm below the top of the blade with the blade in the fully elevated position) or a height just over the maximum cutting depth. Thus, nose 100 functions as a wood stop or pivot stop, which will be discussed later in more detail. The contact surface is angled so that the work piece will not catch on the shroud when the work piece moves toward the blade; the angled portion of the nose travels up along a work piece as the piece is advanced, until the bottom surface of the shroud rests on the work piece. Given the overall height of the nose, the length of the nose is a compromise between keeping the nose short and creating a slope that enables the work piece to smoothly engage the nose and lift the guard assembly. A nose with a less-steep slope must be longer in order to reach the same height, and will allow a work piece to more smoothly engage the shroud. A steeper, shorter nose will take up less space, but it will take more force from a work piece to raise the shroud. In the presently disclosed embodiment, the nose is at an angle of about 40 degrees relative to the table when the blade guard assembly rests on or adjacent the saw table, as shown in at least FIG. 2, in what may be thought of as the nominal position of the blade guard assembly. Sloped contact surface 104 at the front of the nose curves to join a bottom surface 106 of the shroud (labeled in FIGS. 14 and 17). With this configuration, nose 100 maintains contact or close proximity with the top surface of the table insert or with the top surface of the work piece as the blade guard assembly moves to accommodate a work piece. The assembly adjusts automatically to the height of a work piece as the work piece is brought into contact with the shroud, and the assembly moves back down to contact, or rest just above, the insert 16 and table 12, which together may be thought of as the work surface, when the work piece is no longer in contact with the shroud.

Nose 100 can also include curved regions 108 and cutouts 110, which provide surfaces for a user to grip in order to raise the shroud away from the table to access the insert or internal saw components. It is advantageous to provide such grip surfaces as far away from the blade as possible, to minimize the chance that a user will accidentally contact the blade while lifting the shroud. The cutouts 110 also make the nose lighter and thus easier to lift, which is important when the blade is tilted at 45 degrees and the wood approaches the blade at a 45-degree miter gauge angle. A heavy nose in this situation could possibly cause the work piece to bind against the shroud. The borders of the cutouts are formed by bending the material of the nose inward along the edges of the cutouts creating a webbed framework which adds strength to the nose. This can be seen clearly in at least FIGS. 8 and 9.

The possibility of the shroud binding on a workpiece during a compound miter cut (with both the blade and work piece at 45-degrees) can be minimized by providing a "sharp" corner 112 on the left side of the nose, along the edge of contact surface 104. The corner can be seen in at least FIGS. 9 and 14. It digs lightly into the top of a work piece, which helps the shroud to track straight across the work piece. It will be appreciated that shroud 52 could also be formed without corner 112, with a corner on both sides of contact surface 104, or with a corner on just the right side, within the scope of the presently disclosed invention.

The exterior of each shell can include one or more arcuate ribs 128 which provide strength and rigidity to the shells. The ribs can also contact support arm 54 and help prevent shroud 52 from twisting relative to the support arm. When assembled to form shroud 52, right and left shells 56 and 58 form a slot 140 at the rear of the shroud, into which splitter 26 can extend, as can be seen in at least FIGS. 10, 37, and 38. It is advantageous to make slot 140 relatively narrow and short, so divider wall 82 can continue all the way to the rear of the shroud, in order to capture and redirect air and dust particles coming up from below the table at the back of the shroud.

The bottom surface of each shell includes a flat edge adapted to rest on top of the work surface when the orientation of the blade is set at 90-degrees relative to the work surface. Alternatively, the bottom edge of one shell may be raised slightly to accommodate the change when the blade tilts relative to the work surface. The left bottom edge of the guard, when facing the saw in the normal operating position, would be raised for a left-tilting saw and the right bottom edge would be raised for a right-tilting saw. In this configuration, if one bottom edge rests on the work surface when the blade is set at 90-degrees, the other bottom edge typically would rest on the work surface only when the blade is tilted to 45-degrees. However, this configuration has the disadvantage of leaving part of the blade exposed when the blade is set to 90-degrees, which in turn interferes with dust collection and can be a potential safety hazard. The presently disclosed invention addresses this issue through a side extension 60 which moves relative to shroud 52.

In a first exemplary embodiment, shown in FIGS. 19-25, side extension 60 can pivot about two points on right shell 56. The side extension includes two slots, 150 and 152, both of which are generally oval in shape and oriented generally vertically. The front slot 150 fits over a boss 154 near the front of right shell 56 (labeled in FIG. 17). A polycarbonate finish washer 156 and self-threading screw 158 are used to attach the extension to the right shell, as can be seen in at least FIGS. 7 and 14. The washer is light and loose enough to allow slot 150 to move up and down freely around the boss. Right shell 56 is essentially "sandwiched" between side extension 60 and finish washer 156, with boss 154 in the shell being sized to be close to the thickness of the side extension. This maximizes the contact between cylindrical boss 154 and hole 150, which also helps prevent side extension 60 from tipping out away from the interior surface of right shell 56.

The rear slot 152 in the side extension fits over a boss 160 which extends from the rear end of right shell 56. A horizontal crossbar 162 is disposed at the end of the boss, and it prevents the side extension from moving laterally away from the shell. This can be seen in at least FIG. 9. This attachment method is simple to manufacture and makes the guard easy to assemble, since the rear slot 152 is placed over the crossbar with the extension pointing "down" instead of "forward" (i.e. rotated down 90 degrees relative to its normal position), which causes slot 152 to align with crossbar 162. The extension is then pivoted up, locking the rear end in place, the front slot 150 is slid onto boss 154, and the screw and washer are installed. It can be seen in FIGS. 6, 13, and 14 that an elongate slot 166 is disposed in the bottom of contact surface 104 on right shell 56. This slot allows the side extension to extend further toward the front of the shroud, which provides greater coverage of the blade when the blade and blade guard assembly are tilted to 45-degrees. Side extension 60 is free to pivot up and down about both attachment points. Thus, when blade 20, splitter 26, and blade guard assembly 50 are tilted to make bevel cuts, and right shell 56 therefore tilts away from the work surface, side extension 60 slides down from the inside of right shell 56 and rests on, or adjacent to, the work surface. This is shown in at least FIG. 41. This maintains substantially continuous coverage of the blade as it is tilted relative to the work surface, which helps to prevent unintended contact with the blade as well as maximizes dust collection.

Side extension 60 is shaped generally like a rectangle, although the front end is slightly taller than the rear end. The four corners 170, 172, 174, and 176 are all rounded, however the front, bottom corner 172 has a much larger radius than the other three corners. A front contact surface 178 extends between the top and bottom corners 170 and 172 at an angle of about 70 degrees. This allows a work piece to easily push the side extension up and out of the way when the work piece is advanced toward the blade. The side extension also includes a cutout 180, somewhat behind front corner 170, which provides clearance for the bottom edge of divider wall 82 when the side extension is retracted all the way into cavity 86 in the shroud. This can be seen in at least FIG. 3. The side extension is taller at the front end than the rear end, to match the shape of right shell 56. Rear end 188 is generally straight, and perpendicular to bottom edge 184.

Figure 41:
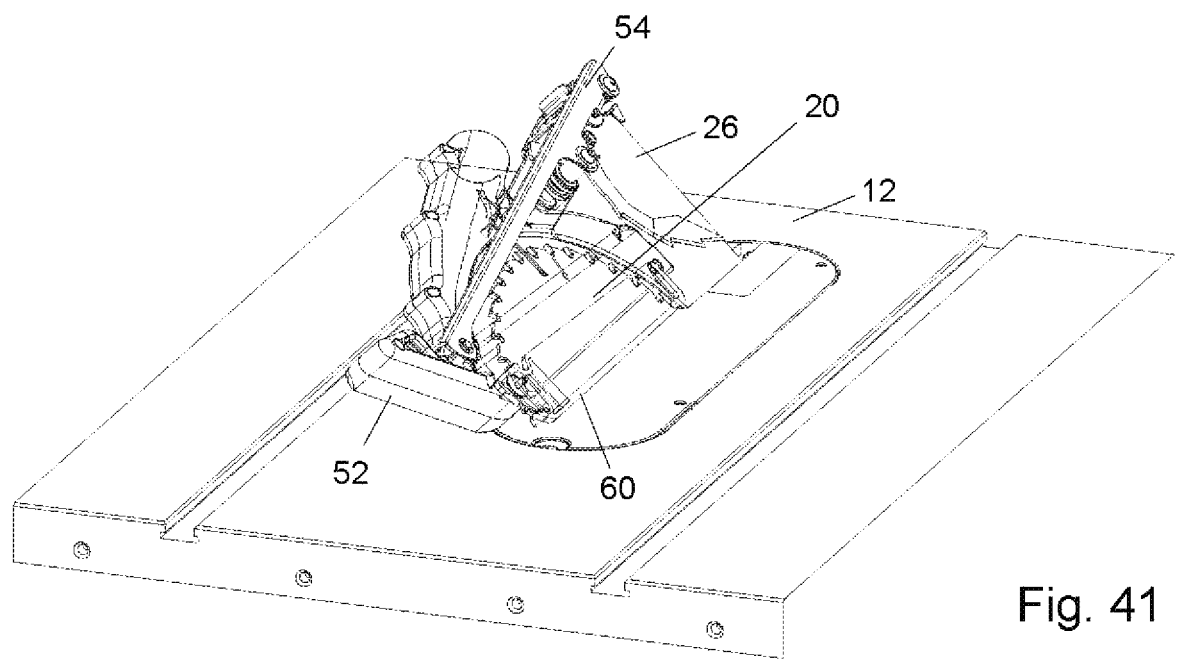
FIG. 41 shows a perspective view of the blade guard assembly installed in the table saw of FIG. 1, with the blade tilted.

When the blade is tilted from 45-degrees back to its normal operating position of 90-degrees, the splitter and blade guard assembly move with the blade, and the side extension contacts the work surface or work piece and pivots upward about bosses 154 and 160, as shown by the position of the side extension in FIGS. 3 and 4. The side extension fits within the side walls of the shroud such that, when the side extension is pivoted upwards fully into cavity 86, a flange 186 along bottom edge 184 of the side extension follows the bottom edge 142 of right shell 56, and top edge 182 of the side extension follows along and just below contour 144, which extends along the inner surface of the right shell. When the blade is tilted to 45-degrees, and no work piece is in contact with the shroud, the bottom edge 146 of left shell rests on the work surface, and the bottom edge 142 of right shell 56 is raised up from the work surface. In this case, the side extension pivots down so that the flange 186 of the side extension remains in contact with, or nearly adjacent, the work surface, as shown in FIG. 41. When a work piece is brought into contact with the tilted blade guard assembly, the front edge of the work piece will first contact surface 104 on nose 100, raising the shroud. As the work piece is advanced further, it will contact front edge 178 on side extension 60, causing the extension to retract into the shroud.

Figures 26, 27, 28, 29:
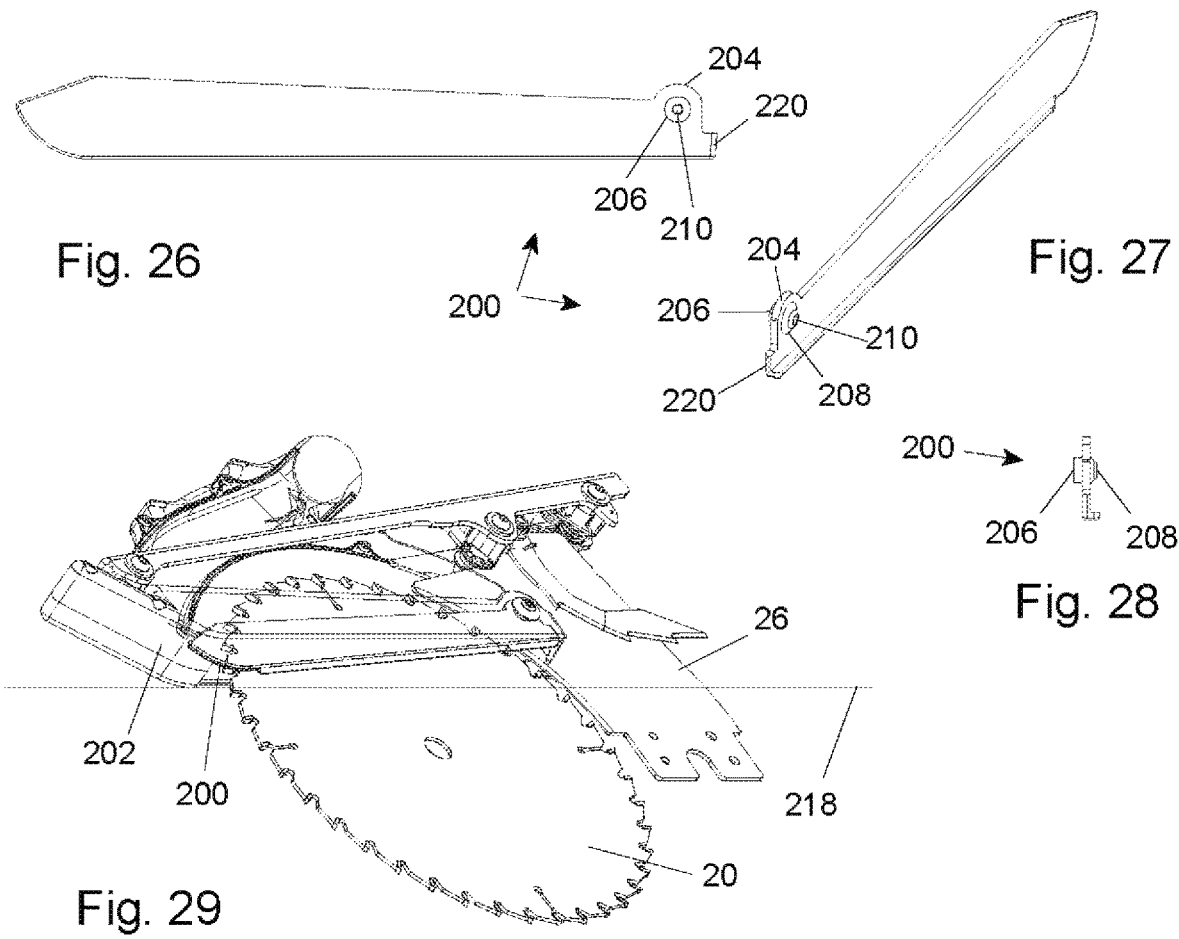
FIG. 26 shows a side view of an alternate side extension.
FIG. 27 shows a perspective view of the alternate side extension of FIG. 26.
FIG. 28 shows a rear view of the alternate side extension of FIG. 26.
FIG. 29 shows a perspective view of the alternate side extension of FIG. 26 as part of a blade guard assembly.

In a second exemplary embodiment, shown in FIGS. 26-30, an alternate side extension 200 is attached to an alternate right shell 202 of shroud 52 in such a way that it is free to pivot up and down about a single point relative to the shroud. FIGS. 26 through 28 show various views of the second exemplary side extension isolated from other structures. Side extension 200 is shaped similarly to, and functions in substantially the same manner as, the one disclosed above. The first exemplary embodiment covers the blade more fully when the blade is tilted to 45-degrees, since it is able to slide down along the two bosses, instead of pivoting about a single boss. However, through careful positioning of the pivot point, the second exemplary embodiment can provide substantially the same coverage.

Figure 30:
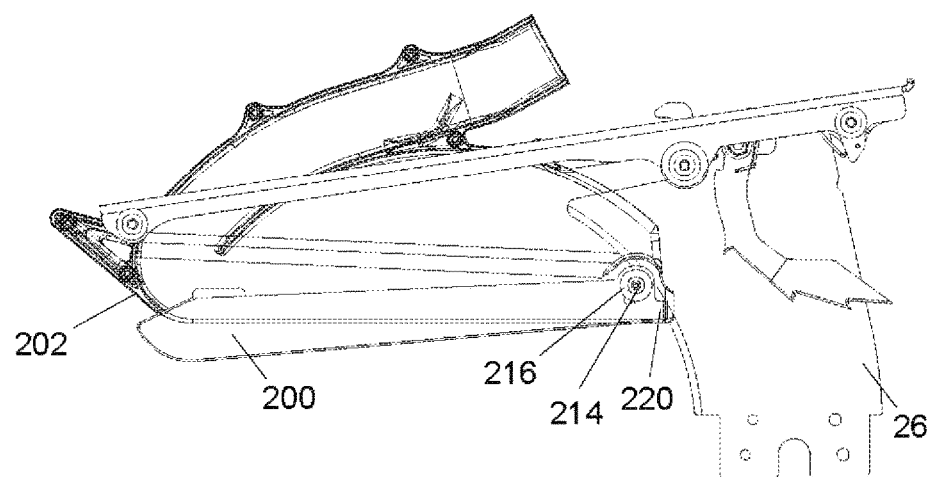
FIG. 30 shows a side view of the alternate side extension of FIG. 26 as part of a blade guard assembly.

The rear end of the extension includes a semicircular top 204, which extends radially outward from the point about which the side extension pivots, in order to restrict sideways movement of the extension, which prevents it from flexing inward and contacting the blade. The rear end of second exemplary side extension 200 is pivotally attached near the rear end of alternate right shell 202. It can be seen that side extension 200 has a circular boss 206 on the outward-facing side, a semi-circular dome 208 on the inward-facing side, and a hole 210 which passes through the boss and dome. Boss 206 fits within a corresponding hole in right shell 202. A self-threading screw 214 passes through a polycarbonate finish washer 216, then through the boss and dome to connect the side extension to right shell 202, as discussed above regarding the first exemplary side extension. FIG. 29 shows side extension 200 pivoted down to cover the side of blade 12, with the blade, splitter 26, and guard assembly 52 tilted to 45-degrees. It can be seen that, as discussed above, the bottom edge of alternate right shell 202 is raised up from the table (represented by line 218), which allows the extension to pivot down about boss 206 until tab 220 on extension 200 contacts the rear of right shell 202, which prevents the side extension from pivoting down further. It can be seen in FIG. 29 that side extension 200 does not pivot down all the way to the table; it rests just above the table. It extends far enough down to prevent a user from contacting the blade, and the gap between the extension and the table does not interfere with dust collection, since any workpiece will contact the side extension, and the side extension will rest on top of the workpiece. This allows the overall shroud to be shorter, since a taller side extension would necessitate a taller shroud, in order to allow the side extension to retract fully into the shroud. FIG. 30 shows the blade guard assembly and splitter isolated from other structures, with side extension 200 pivoted down about boss 206, so tab 220 rests against the rear of right shell 202.

If the overall length of shroud was increased, so nose 100 was further from splitter 26, a side extension similar to second exemplary extension 200 could be positioned to pivot around a single point near the front of the shroud, so it "trailed" behind the pivot point. This design would have the advantage of minimizing the amount of force required to push the extension up and out of the way with a work piece. The pivot point of the extension would have to be further forward, compared to the presently depicted embodiments, in order for the extension to provide coverage at the front of the blade when the blade is tilted to 45-degrees.

It is advantageous to provide an inwardly projecting flange on each side of the bottom edge of shroud 52 to add strength to the guard, as can be seen in at least FIGS. 7, 16, 18, and 22. Flange 122 on the left side of shroud 52 extends directly from left shell 58, while the flange 186 on the right side of the shroud extends from side extension 60. Right shell 56 does not have an inwardly projecting flange, since the bottom of side extension 60 (and therefore flange 186) is intended to be near, or in contact with the table or a work piece. The flanges also will abut the blade if the shroud deflects to the side, thereby protecting the shroud from the blade by minimizing the region over which the blade contacts the shroud in the event of accidental contact between the blade and the shroud. However, in an embodiment of shroud 52 without a side extension, the flange on the right side of the shroud could extend from the right shell. Additionally, the shroud could be formed without one flange, or without both flanges.

Holes, such as holes 130 and 134, labeled in FIGS. 8 and 9, can be provided in shroud 52, to provide a direct line of sight to the cutting regions of the blade. Hole 130 is disposed at the rear edge of nose 100, and it provides a view of the front of blade 12. Divider wall 82 has a cutout 132 (labeled in FIGS. 16 and 17), which prevents the divider wall from obstructing the view provided by hole 130. In the presently disclosed embodiment, left shell 58 has two holes 134 disposed near the front, bottom edge of the guard portion. These holes provide a clear view of side of the blade. However, it will be appreciated that shroud 52 could be provided with more or fewer holes within the scope of the presently disclosed invention. These holes decrease the efficiency with which dust can be collected, so the location and size of the holes must be carefully chosen to maximize both visibility and dust collection. One possible solution to this issue is to provide small, pliable, clear, plastic inserts to fit within the holes, and which could the easily be removed when needed.

Shroud 52 is designed to channel dust generated above the table surface so that the dust can be collected and removed through a dust port 78 that is integral with the shroud. As discussed, the shroud includes a divider wall 82 which extends from the rear of the guard towards nose 100, and ends just before the front, bottom edge of the shroud (surface 106 of the nose). The divider wall defines the top of cavity 86, and creates a dust channel 80 (labeled in at least FIGS. 4 and 6), which extends from the front section of the shroud towards the back, following the curve of the semicircular cavity 86. The structure and function of the dust collection features of a shroud are disclosed in U.S. Pat. No. 9,586,335, titled "Blade Guard with Dust Collection," which is incorporated herein by reference. Dust port 78 is shaped to accommodate the end of a vacuum hose. The inside surfaces of the dust port are slightly tapered inward moving into the port to match the taper of many vacuum hoses. This allows the hose to be connected to the dust port by a press-fit. It is advantageous to curve the rear end of dust channel 80 up slightly as it approaches dust port 78 to provide clearance for a dust hose or other components to be attached without interfering with the lower portion of the shroud or other components, such as support arm 54.

Shroud 52 is pivotally connected to support arm 54, as stated. Support arm 54 is a folded metal arm with a generally U-shaped cross section, and it is shown isolated in FIGS. 31-36. The support arm may also be thought of as a support member, a member, or a top guard. The support arm includes a plurality of tabs and openings, which are used to connect the support arm to splitter 26 and shroud 52. Near the front of the support arm, there is a first tab 300 with a first hole 302 and a second tab 304 with a second hole 306. The tabs extend down away from the support arm at an angle of about 90-degrees, and are both semicircular in shape, although it will be appreciated that other angles or shapes could be used. The support arm includes a large opening 308 adapted to fit over and around a designated portion of shroud 52 (i.e. narrow section 92). Shroud 52 includes a hole 120 near the front of the shroud (as shown in FIGS. 8, 17, and 18), and support arm 54 is adapted to fit over and around the shroud so that holes 302 and 306 in the support arm align with hole 120 in the shroud when narrow section 92 is within opening 308. Hole 120 extends through a boss that spans the shroud from one side to the other. A grooved clevis pivot pin 310 extends through holes 302, 120, and 306 to pivotally connect the shroud to the support arm. An e-clip 312 secures the end of the pin. The shaft of the pin is slip fit into hole 302, and the head of the pin, which fits into hole 304, is substantially flush with the outside surface of the support arm when the pin is positioned properly, so as not to increase the side-to-side dimension of the overall blade guard assembly, particularly on the left side.

The pivot connection between shroud 52 and support arm 54 allows for a metal-to-metal pivot rather than a metal-to-plastic pivot because tabs 300 and 304 in the support arm contact pivot pin 310. Having a metal-to-metal pivot connection permits the connection to be more precise than it otherwise could be because the metal components may be manufactured with smaller or tighter tolerances and because the metal-to-metal pivot connection will wear less than other connections. This is important because a more precise pivot connection means there will be less play, vibration, or side-to-side movement of the shroud. The relatively close fit of the pivot pin 310 in holes 302 and 306 serves to keep the pin from moving out of the plane of its normal position. This embodiment has several advantages over other methods of attachment, such as a screw and a threaded bushing or nut. The pivot pin and e-clip are cheap to manufacture and easy to assemble. Also, this pivot pin and e-clip method prevents a user from over-tightening a threaded bushing or nut on a screw, which could result in the shroud not being able to pivot relative to the support arm.

The exterior surfaces of the right and left shells include each include an upper, U-shaped projection 124 near dust port 78, and a lower, upside-down U-shaped projection 126 near the rear of the shroud. The lower projections limit the counter-clockwise movement of the shroud relative to pivot pin 310 (when viewed as in FIGS. 3 and 4), and the upper projections limit the clockwise movement of the shroud (when viewed as in FIGS. 3 and 4). The support arm is positioned vertically between the projections, as can be seen in FIG. 4, so upper projections 124 are above the support arm, and lower projections 126 are below the arm. Support arm 54 is sized so that the sides of the narrow section 92 of the shroud slide past the edges of opening 308 in the support arm when the shroud pivots, but projections 124 or 126 abut the surfaces of the support arm when a predetermined amount of rotation has occurred. As the shroud pivots down about pin 310, the upper projections 124 contact the upper surface 314 and a tab 316 on the support arm, thus preventing further downward pivotal motion of the shroud relative to the arm. The upper surface 314 and tab 316 define what may be thought of as the top surface or plane of support arm 54. In a similar manner, as the shroud pivots up, the lower projections 126 contact the underside of the sides 318 and 320 of the support arm, which may be thought of as the lower surface or plane of the arm, and which prevent continued upward pivotal movement of the shroud relative to the support arm. These rotation limits can be seen in FIGS. 3 and 4, respectively, and may be thought of as upper and lower rotation limits, or first and second positions, with the upper limit, or second position, shown in FIG. 4 and the lower limit, or first position, shown in FIG. 3. In the presently disclosed embodiment, the upper and lower projections on shroud 52 are integrally formed with the right and left shells, but it will be understood by one of ordinary skill in the art that other kinds of projections could be used, including adjustable components. Shroud 52 could also be formed without projections 124 and 126, or with other numbers or combinations of projections, such as only having projections on one of the right or left shells. Additionally, shroud 52 could be formed with only one projection or set of projections, to limit either the upward or downward pivotal movement of the shroud. Upper projections 124 also keep the shroud from rotating too far downward when blade guard assembly 50 is removed from saw 10, which would otherwise make the assembly awkward to handle. Lower projections 126 also keep the shroud from rotating too far up, and potentially allowing a work piece greater than the maximum cutting height to be placed in contact with the saw blade, as will be discussed. In the presently disclosed embodiment, the range of motion of the shroud about pin 310 is about 15 degrees. However, it will be appreciated that the projections 124 and 126 can be positioned on shroud 52 to provide any desired range of motion for the shroud. The projections also provide surfaces for a user to grasp when raising or moving the blade guard assembly, since the outer surfaces thereof are otherwise substantially smooth.

Figure 37:
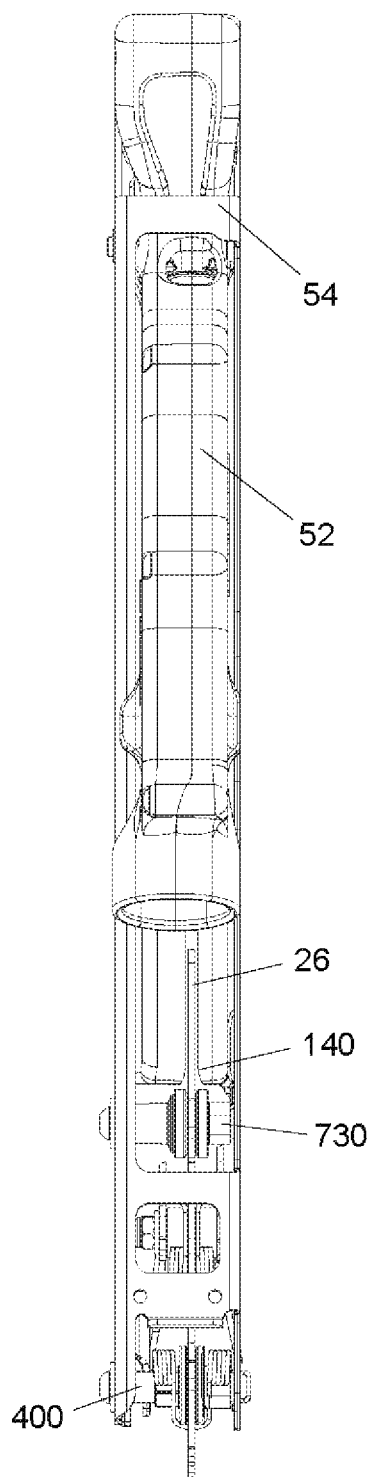
FIG. 37 shows a top view of the blade guard assembly installed on a splitter.

In the presently disclosed embodiment, support arm 54 is a stamped, bent piece of sheet metal, but it will be appreciated that other materials, such as plastic, or other methods of manufacturing could be used within the scope of the presently disclosed invention. Support arm 54 is designed to have a relatively significant width or side-to-side dimension, which provides stability for the shroud and minimizes the play, vibration, and side-to-side movement that could otherwise result. One possible width of support arm 54 is around 1.5 inches, although other dimensions are possible. FIGS. 37 and 38 show top-down and bottom-up views of blade guard assembly 50 installed on splitter 26. It can be seen in at least FIG. 37 that shroud 52 fits substantially within the footprint of the support arm. Support arm 54 includes two side walls 318 and 320, and a plurality of tabs extend from the side walls. The side walls extend generally perpendicularly away from what may be thought of as the top surface 314 of the support arm. The top surface 314 includes two openings 308 and 324, which provide clearance for the shroud and other components. These three sides (top 314 and walls 318 and 320) form an opening or cavity 322, in which the splitter, shroud, vertical adjustment mechanism, lateral guide mechanism, and anti-kickback assembly are disposed, as will be discussed. As discussed above, the two front tabs 300 and 304 are used to pivotally connect the shroud to the support arm.

The connection between upper surface 314 and right side wall 318 of support arm 54 is continuous, forming a rounded corner between the two sections, but the connection between the upper surface and left side wall 320 is intermittent, with only a few sections of the "corner" connecting the sections. Thus, upper surface 314 is not level with the top edge of left side wall 320, so the projections 124 on shroud 52 would not contact both surfaces concurrently to stop the movement of the shroud. Instead, the projection 124 on right shell 56 would contact surface 314, leaving a gap between the projection 124 on left shell 58 and the top of left side wall 320. To address this issue, a limit stop tab 316 is provided on left side wall 320, as can be seen in at least FIGS. 32 and 35, and it extends up from left side wall 320 until it is level with upper surface 314.

A pair of first and second lateral guide tabs 330 and 334 extend down from the side walls of the support arm, near the rear of opening 308. The tabs include holes 332 and 336, respectively, which are used to attach a lateral guide mechanism, as will be discussed. The tabs 330 and 334 are both shaped generally like a semicircle, but it will be appreciated that other sizes and shapes of tabs could be used within the scope of the present invention.

The support arm also includes a pair of rear tabs 340 and 360, which include holes 342 and 362 respectively. The holes are used to attach a vertical adjustment mechanism 400, which is also the component used to connect the support arm to the splitter, as will be discussed. The right rear tab 340 is generally semicircular in shape, although it will be appreciated that other shapes could be used. A third rear tab 344 also extends from the right side of the support arm. It extends inward from right side wall 318 for a short distance, forming a horizontal section 346, then turns down and forms a vertical section 348, which includes a small hole 350 near its rearmost corner. FIG. 34 shows a rear view of support arm 54, and sections 346 and 348 are perhaps most clearly seen in that figure.

The left rear tab 360 is shaped generally like a triangle, with rounded corners. The top edge of the triangle extends along the line defined by the top of side wall 320. The rearmost corner 364 is rounded, and the side 366 then extends down to bottom corner 368. A larger hole 362 is disposed near the center of the triangle, and a smaller hole 370 is disposed near the bottom corner 368 of the triangle. The tab 360 then extends back up towards side wall 320, with a section 372 extending at a slight angle, then switching to a section 374 which extends the rest of the way towards the side wall at a shallower angle. These surfaces 372 and 374 play a crucial role in limiting the movement of the spring used to connect the support arm to the splitter, as will be discussed. Larger hole 362 in left rear tab 360 is aligned with larger hole 342 in right rear tab 340, and the smaller hole 370 in tab 360 is aligned with smaller hole 350 in the third right rear tab 344.

The first and third rear tabs (the two on the right side wall) could be a single tab, like the second rear tab (on the left side), but, as can be seen in at least FIGS. 37 and 39, the splitter and blade are not centered within the shroud and support arm. The support arm is attached to the splitter using a spring 410, as will be discussed, and the third tab provides an offset so the attachment points of the spring can be equally spaced away from the splitter, as can be seen in at least FIG. 39.

Figure 42:
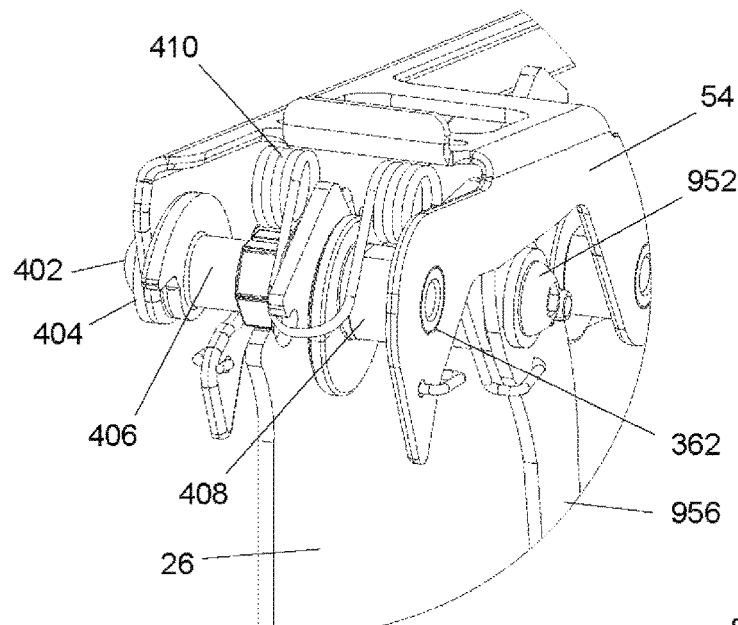
FIG. 42 shows a detail view of the connection between the blade guard assembly and the splitter.

As stated, right side wall 318 has tabs 330, 340 and 344 extending therefrom, and left side wall 320 has tabs 334 and 360 extending therefrom. FIG. 42 shows a sectional view of the connection between blade guard assembly 50 and splitter 26. A bolt 952 and an anti-kickback pawl 956 are visible in that figure, and it can be seen that the head of the bolt extends until it is parallel with, or extends just beyond, the edges of tabs 334 and 360 in support arm 54. It will be appreciated that tabs 334 and 360 in the support arm must be spaced apart (i.e. not one continuous section) in order to provide clearance for bolt 952. The spacing between tabs 330 and 340 on the right side of the support arm is not required for clearance, but the design of the support arm must both minimize the weight and maximize the strength and rigidity thereof. Thus, while the entire side wall 318 extends further down than side wall 320, relative to upper surface 314, making tabs 330 and 340 a single continuous tab would add too significantly to the weight of the support arm, and could prevent it from moving to accommodate a work piece as the work piece was advanced toward the blade.

Figure 43:
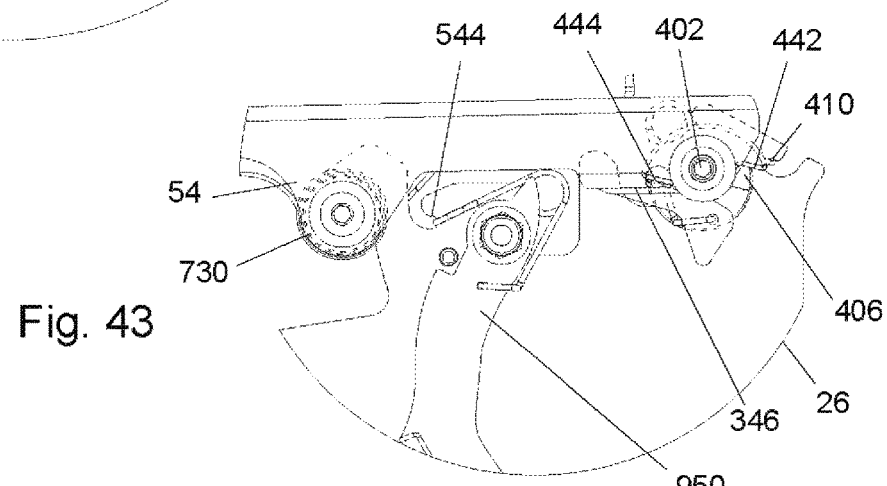
FIG. 43 shows a side view of the connection between the blade guard assembly and the splitter, with the blade guard adjusted to its lower position.
Figure 44:
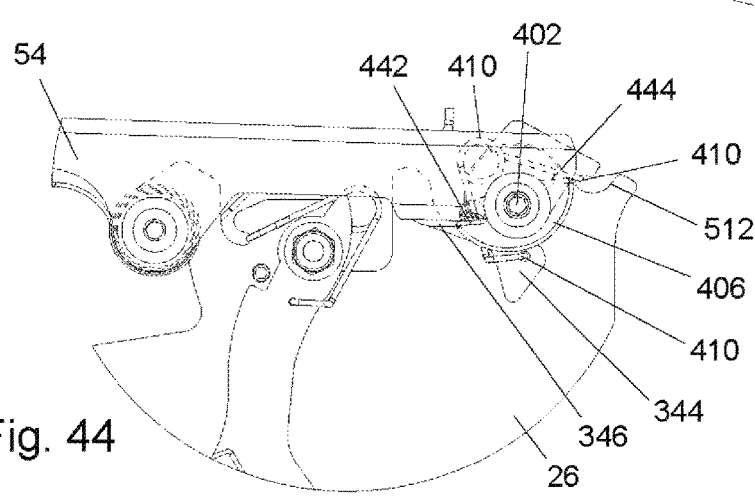
FIG. 44 shows a side view of the connection between the blade guard assembly and the splitter, with the blade guard adjusted to its higher position.
Figure 45:
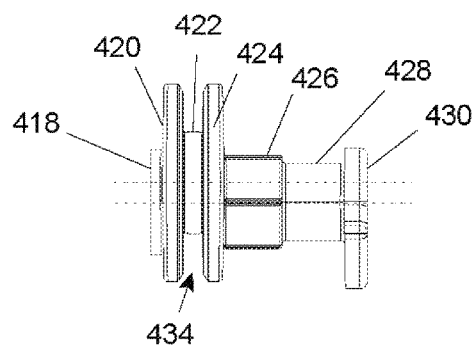
FIG. 45 shows a view of the eccentric leveling bushing.
Figure 46:
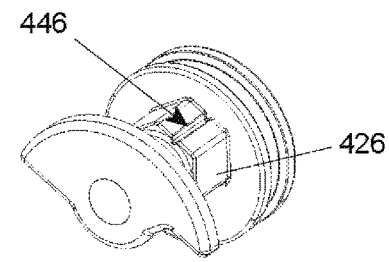
FIG. 46 shows a perspective view of the eccentric leveling bushing.
Figure 47:
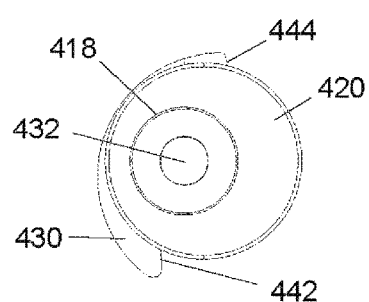
FIG. 47 shows a side view of the eccentric leveling bushing.
Figure 48:
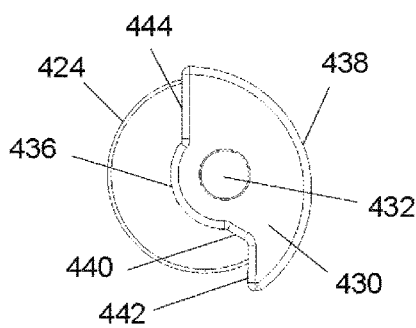
FIG. 48 shows a side view of the eccentric, leveling bushing.
Figure 49:
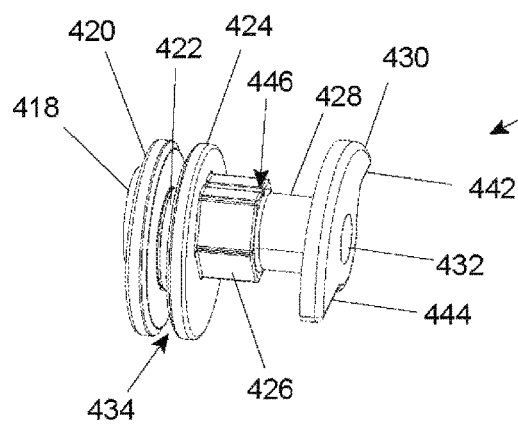
FIG. 49 shows another perspective view of the eccentric leveling bushing.
Figure 50:
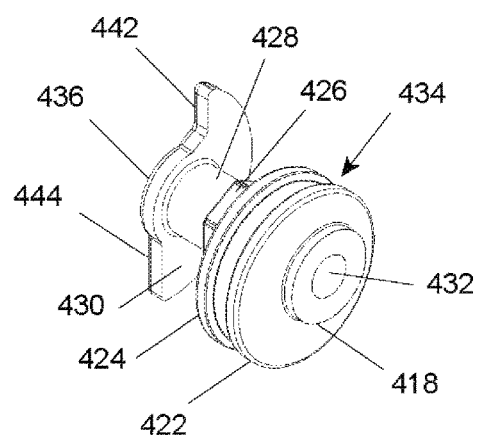
FIG. 50 shows yet another perspective view of the eccentric leveling bushing.
Figure 51:
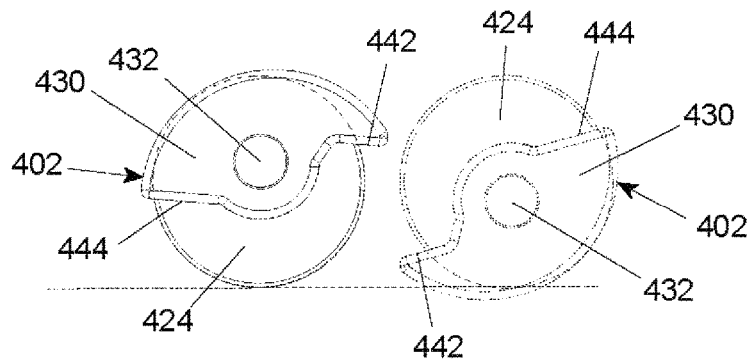
FIG. 51 shows the adjustment positions of the eccentric leveling bushing.

As stated, the blade guard assembly 50 includes a vertical adjustment mechanism 400, which also serves to connect support arm 54 to splitter 26. FIG. 42 shows a sectional, isometric view of this mechanism with the support arm and splitter, and an exploded view of the mechanism is shown in FIG. 7. FIGS. 43 and 44 show a side view of vertical adjustment mechanism 400 at the minimum and maximum height positions, with the components that would normally be obscured by support arm 54 shown in dashed lines. The mechanism is designed to allow the support arm and shroud to rotate around their attachment point to splitter 26, while also allowing the height of that attachment point to be adjusted as needed. Vertical adjustment mechanism 400 consists of a bolt 402, a washer 404, an eccentric leveling bushing 406, a threaded bushing 408, and a spring 410. As mentioned previously, the side walls 318 and 320 of the support arm extend down and form a cavity area 322. The support arm is configured to fit over the splitter with the splitter positioned within the rear area of cavity 322.

FIGS. 45-51 show eccentric leveling bushing 406 isolated from other structures. The bushing is generally cylindrical, with three sections 418, 422, and 428 of various smaller diameters and various lengths, two sections 420 and 424 of an equal, larger diameter, a thicker, octagonal section 426, and a semicircular section 430. The sections are arranged so that one thin section 422 with a smaller diameter is between the two sections 420 and 424 with a larger diameter, and one thin section 418 with a smaller diameter is on the other side of one of the large sections. The hexagonal section 426 is disposed on the other side of the other larger section, followed by a longer section 428 with a smaller diameter and finally the semicircular section 430. A cylindrical opening 432 extends through the bushing, from the thin section 418 to the semicircular section 430. However, it can be seen that the two sections 420 and 424 with the larger diameter, and the section 422 disposed between them, are offset from the centerline of the other sections, as shown by the two dashed lines in FIG. 45. Thus, as the bushing is rotated about opening 432, the motion of the larger diameter sections 420 and 424, and the smaller diameter section 422 there-between, is eccentric relative to the axis of rotation. This allows the vertical position of the support arm to be adjusted, as will be discussed. Octagonal section 426 allows the bushing to be grasped and rotated by hand or using a pair of pliers, and an index 446, such as a mark, raised section, or cutout, provides a reference for the amount of rotation that has taken place, without a user having to look at the position of semicircular section 430. Sections 420, 422, and 424 provide a groove 434 for the splitter to fit into when blade guard assembly 50 is installed on the splitter, as will be discussed. The semicircular section 430 extends around the cylindrical opening 432, with a small rounded area 436 one side, and a large rounded area 438 on the other side. A straight section 440 extends from rounded area 436, on one side of hole 432, and it joins a second straight section 442 which turns to become rounded area 438. Another straight section 444 extends between the other ends of rounded areas 436 and 438. The sections 442 and 444 are parallel with one another, and form what may be thought of as first and second faces, respectively. These first and second faces provide rotational limit stops for eccentric leveling bushing 406, as will be discussed.

Figure 52:
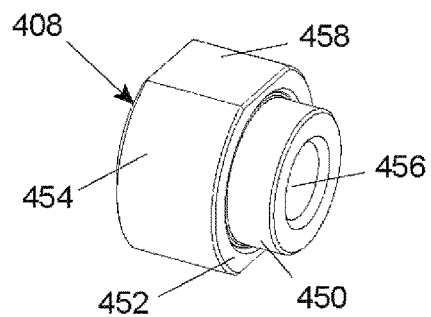
FIG. 52 shows a threaded bushing.

FIGS. 42-44 show vertical adjustment mechanism 400 installed in blade guard assembly 50 on splitter 26, and FIG. 7 shows an exploded view of the adjustment mechanism. It can be seen that bolt 402 passes through washer 404, then through hole 342 in tab 340 in support arm 54, and then through the specially designed eccentric leveling bushing 406, which serves as a spacer. On the other side of the bushing, bolt 402 threads into a threaded bushing 408. The threaded bushing is shown isolated in FIG. 52, and it includes a small cylindrical section 450, a shoulder 452, and a large cylindrical section 454, which has two flat sections 458, positioned on opposite sides of the cylinder. The flat sections 458 allow the bushing to be grasped, such as with pliers, and turned. A threaded opening 456 extends through the bushing. The smaller section 450 is sized to fit into hole 362 in tab 360 in the support arm without any significant play. The eccentric leveling bushing 406 fits snugly between tab 340 and threaded bushing 408 such that, when threaded bushing 408 is tightened on bolt 402, the eccentric bushing and threaded bushing do not move or rotate relative to the support arm, but move with the support arm as the support arm rotates up and down relative to splitter 26.

Figure 53:
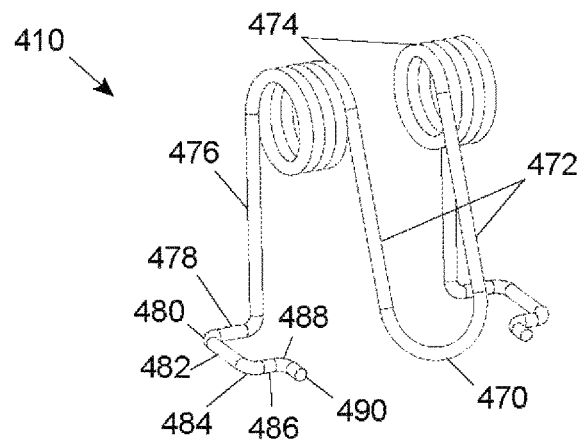
FIG. 53 shows a perspective view of a spring for use with a blade guard.
Figure 54:
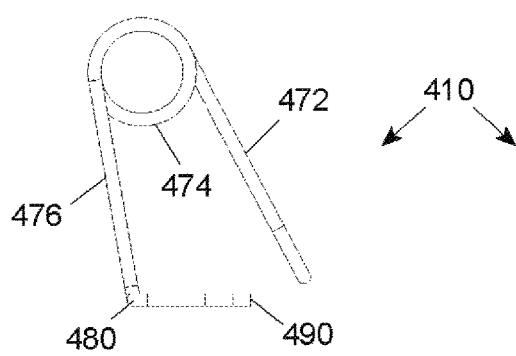
FIG. 54 shows side view of the spring of FIG. 53.
Figure 55:
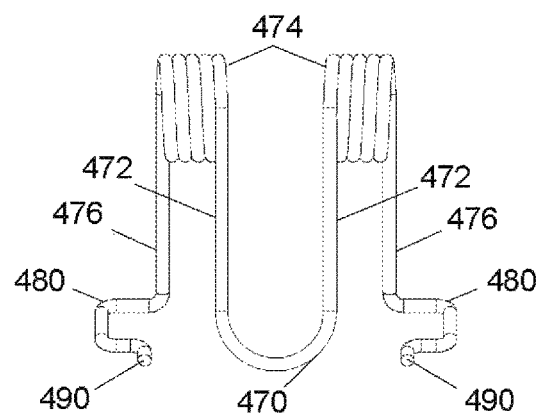
FIG. 55 shows another view of the spring of FIG. 53.

FIGS. 53, 54, and 55 show various views of spring 410. As shown in FIG. 54, spring 410 has a generally triangular shape when viewed from the side, with a coil at the top corner and straight segments emerging downward from the front and back sides of the coil. Spring 410 is formed out of a wire that is bent in the middle, as if bent around the shaft of a small cylindrical rod, to form an open loop 470. The loop is wide enough to fit around the flat sides of larger diameter sections 420 and 424 in bushing 406, so it is about half an inch in width. The two ends of the wire then continue straight and parallel to each other for about an inch, forming two sections 472. Each wire is then wound in such a way as to create a coil 474 on each side of the loop, and the two coils are generally coaxial. Viewing the spring with loop 470 on the right side, both coils are wound in a counter-clockwise direction moving away from the center of the spring. Each end of the wire exits its respective coil on the outward facing side of the coil, to the rear of the coil, on the opposite side of the coil from which the loop extends. The ends of the wires extend continue straight and generally coplanar for about an inch. The plane formed by the straight wire segments 472 near the loop is at an angle of roughly thirty degrees to the plane formed by the straight segments 476 that exit the coils. Each of the wires then bends roughly ninety degrees outward and continues about an eighth of an inch along a line that is roughly parallel to the axis through the coils, forming a section 478. Each wire then bends ninety degrees again, forming a corner 480, and continues for about one quarter of an inch in a direction that forms an angle of roughly 120-degrees with straight segments 472. This forms sections 482. Each section 482 of the wire then bends ninety degrees inward for another eighth of an inch parallel to the other eighth-inch segment, forming corners 484 and eighth-inch sections 486. Finally, each wire bends ninety degrees and continues for about one-sixteenth of an inch in a direction roughly parallel to the quarter inch segments to form corners 488 and sixteenth-inch spring end segments 490. A small hole 350 is located in tab 344 in support arm 54, and a second small hole 370 is located in tab 360, as stated, and each spring end segment 490 passes through one of the holes and lies roughly against the inner surface of each tab to connect the spring to each tab. It can be seen in at least FIG. 42 that the ends 410 of the spring extend around tabs 344 and 360 in the support arm and bushing 406 is "sandwiched" in the triangle formed by the spring, with straight sections 472 disposed on either side of sections 420 and 424 in bushing 406, and loop 470 extending toward and around the rear end of the bushing.

As can be seen in at least FIGS. 42-44, the rear end of support arm 54 is connected to splitter 26. Blade guard assembly 50 is attached to splitter 26 in such a way that it is held securely in place when in its operable position, but it is also quickly and easily installed or removed by hand without the need for tools and without the need to move a bail, knob, or lever. A user might remove the blade guard assembly for some cutting operations, and therefore, being able to install and remove the guard quickly and easily facilitates guard usage and makes it more likely that a user will re-install the guard after removing it. Splitter 26 is a flat, metal plate with a side-to-side thickness thinner than the kerf of the blades with which it is intended to be used, and it extends above the height of the fully elevated blade so that the blade guard assembly may be mounted thereto. The splitter is securely mounted in the saw to move with the blade as the blade changes elevation and/or tilts.

Figure 56:
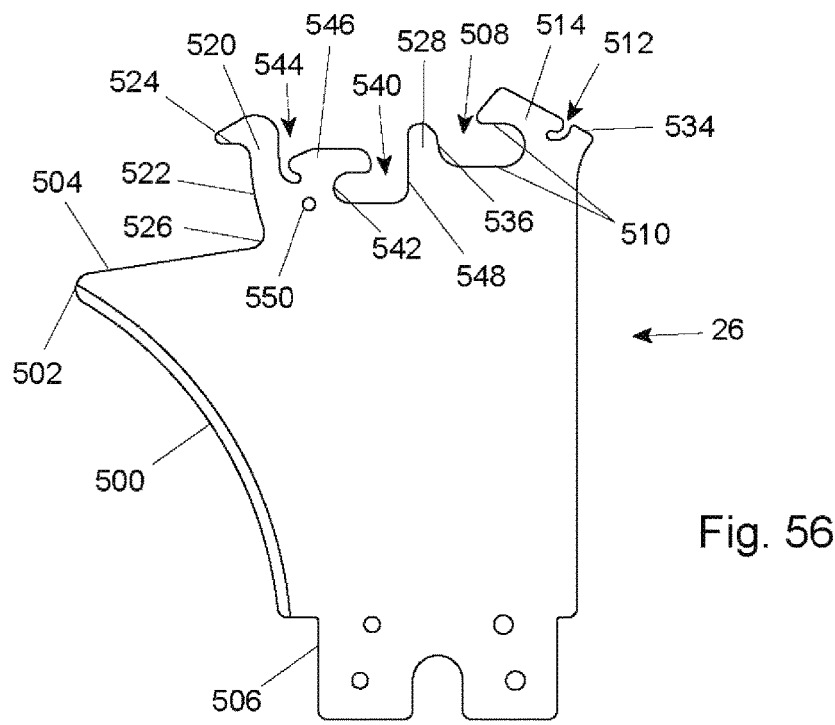
FIG. 56 shows a side view of a splitter.
Figure 57:
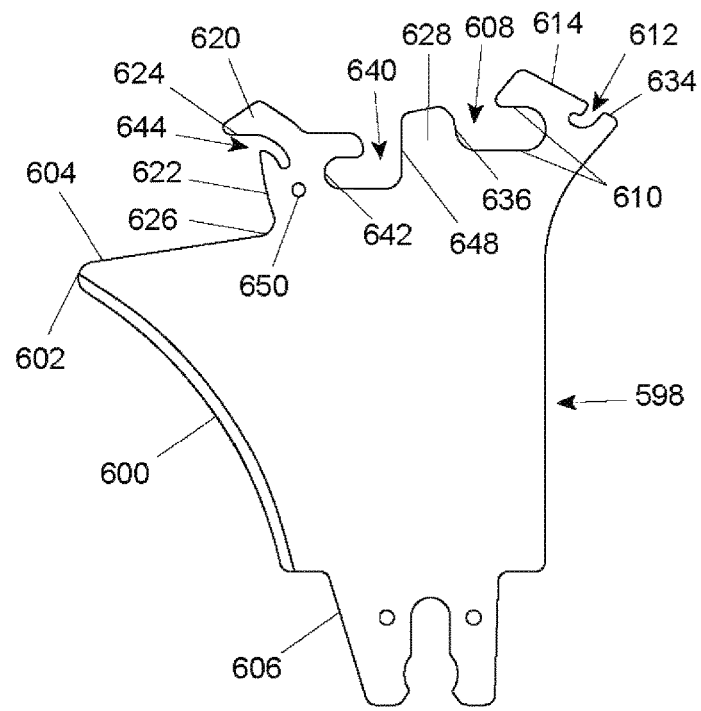
FIG. 57 shows a side view of another splitter.
Figure 58:
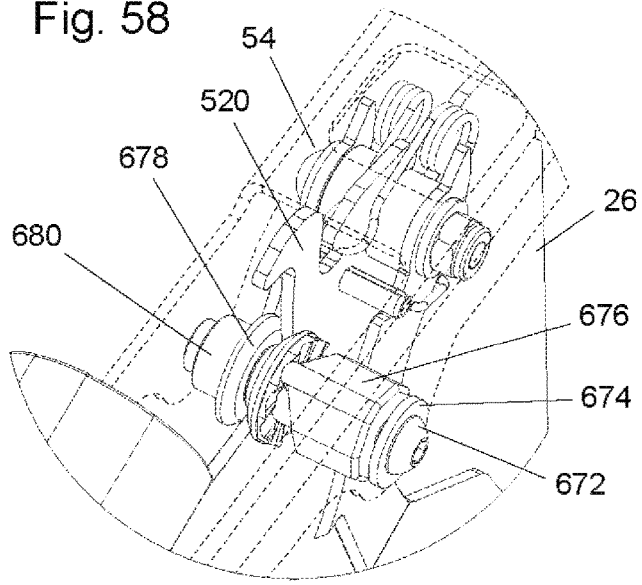
FIG. 58 shows a perspective view of a lateral adjustment mechanism installed on a splitter.

A first exemplary splitter 26 is shown in FIG. 56, and an alternate splitter 598 is shown in FIG. 57. Splitter 26 includes a front edge 500 curved to follow the perimeter of a blade and a rounded tip 502 similar to the structure of a riving knife. Curved edge 500 and tip 502 are chamfered so that they do not catch on a work piece. Splitter 26 also includes an upper edge 504 extending up and away from tip 502. The base 506 of the splitter has shoulders, edges, holes, and cutouts so that the splitter may fit into a mounting system. Splitter bases and mounting systems are described in U.S. Pat. No. 10,118,308, titled "Systems To Mount And Index Riving Knives And Spreaders In Table Saws" and U.S. Pat. No. 10,052,786, titled "Table Saws With Safety Systems And Systems To Mount And Index Attachments," both of which are herein incorporated by reference. It is an advantage of the presently disclosed invention that the blade guard assembly can be configured to accommodate a variety of different saw structures, with only minor modifications to the top and/or bottom regions of the splitter, as can be seen by comparing FIGS. 56 and 57. The splitter also includes extensions 520, 546, 528, and 514, notches 512 and 544, cutouts 508 and 540, and surfaces 510, 533, 524, 526, 534, 536, 542, and 548, all of which will be discussed. Alternate splitter 598 has features which correspond with those in splitter 26, but the features are arranged differently to accommodate differences between the position of the splitters within the insert. The corresponding features in alternate splitter 598 are numbered the same as those in splitter 26, but beginning with 600 instead of 500.

As shown in FIGS. 43 and 44, blade guard assembly 50 is attached to the top, rear of the splitter by vertical adjustment mechanism 400, which fits in a cutout 508 in the splitter. Cutout 508 is shaped generally like a letter "L" with rounded edges. The cutout includes a pair of vertical adjustment surfaces 510, which comprise the top and bottom surfaces of the horizontal part of the "L." Eccentric bushing 406 in blade guard assembly 50 fits into cutout 508 and extends around the vertical adjustment surfaces 510 so that groove 434, formed by the center thin section 422 and larger sections 420 and 424 in the bushing, fits over the edges of the splitter and along the adjustment surfaces when the guard assembly is installed on the splitter. Rearward of cutout 508, there is a small notch 512, which is generally arcuate in shape and extends forward toward the cutout.

Cutout 508 and notch 512 define the edges of an extension 514. To install support arm 54 (and the attached shroud) on the splitter, the support arm is first oriented substantially vertically, with eccentric bushing 406 positioned above and behind cutout 508 in the splitter. Then, a user hooks loop 470 in spring 410 into notch 512, and pulls the support arm forward, stretching spring 410 until eccentric bushing 406 can slide into cutout 508. Once the bushing is in the cutout, the user pivots the support arm and shroud down, continuing to apply tension to the spring, until the a lateral guide mechanism fits over the front edge of extension 520. As the guard assembly is pivoted down, eccentric bushing 406 slides back within cutout 508, around vertical adjustment surfaces 510. The distance between cutout 508 and notch 512 causes spring 410 to stretch, and the tension in the spring holds the blade guard assembly on the splitter, with eccentric bushing 406 held in cutout 508, captured vertically by adjustment surfaces 510. A lateral guide mechanism, which will be discussed later, fits around a lateral adjustment surface 522 on extension 520. Since the lateral guide mechanism is attached to support arm 54 at a fixed distance from vertical adjustment mechanism 400, the lateral guide mechanism is held against the lateral adjustment surface 522 by spring 410 in the vertical adjustment mechanism. It will be appreciated that notch 512 could take many different forms, including being shaped as a projection.

To remove the blade guard assembly from the splitter, a user pulls the support arm forward, stretching spring 410 until the lateral guide assembly clears extension 520. As will be discussed, extension 520 serves as a vertical limit stop for the blade guard assembly, preventing upward rotation of support arm 54 beyond a predetermined point, so the assembly must be taken out of contact with the extension prior to the assembly being removed from the splitter. The user then pivots the assembly to a generally vertical position, and pulls eccentric leveling bushing 406 forward, up, and out of cutout 508. Splitter 26 also includes a generally vertically oriented surface 536, which acts as movement stop to prevent non-elastic deformation of spring 410, which could occur if support arm 54 was pulled too far forward relative to notch 512, with the spring hooked therein. It will be appreciated that splitter 26 could also be formed without surface 536.

Instead of completely removing the blade guard assembly from the saw, a user can pivot the assembly up to a generally vertical position while bushing 406 remains in cutout 508, as shown in FIG. 5. Splitter 26 includes an extended, sloped surface 534, against which an upwardly-extending tab 378 on support arm 54 can rest when the assembly is pivoted up. In this position, eccentric bushing 406 is still held against vertical adjustment surfaces 510, which prevents the assembly from rotating too far back and falling off the splitter. In order for blade guard assembly 50 to pivot further back (clockwise in the orientation shown in FIG. 5) once tab 378 contacts surface 534, the eccentric bushing 406 would have to slide forward (further away from notch 512 in the splitter). However, this would stretch spring 410 further, and the spring is over-centered in the position shown in FIG. 5. In other words, the position of bushing 406 within cutout 508 is stable when the assembly has been pivoted up to its generally vertical position, and therefore, the assembly is stable in this position. It is a feature of the presently disclosed invention that the blade guard assembly can be pivoted up to a stable position, and then be quickly and easily returned to its normal operating position, without being removed from the splitter, and without a user having to use any tool, loosen any component such as a nut or lock, and without a user having to manipulate a bail, knob, or lever. The pivot point of the vertical adjustment mechanism is in substantially the same position within cutout 508 when the blade guard assembly is in the standard and tilted-up positions, which may be thought of as first and second positions, respectively. In other words, narrow section 422 in bushing 406 is in substantially the same position within cutout 508 with the blade guard assembly in either of the first or second (nominal or tilted-up) positions. The bushing 406 is moved out of its normal position when the blade guard assembly is moved between the first and second positions, since the lateral guide assembly has to clear extension 520. With the blade guard assembly in the tilted-up position, a user can perform tasks, such as changing the blade, without having to completely remove the assembly from the splitter.

Positioning cutout 508 and extension 520 a relatively large distance apart, having splitter 26 extend into cavity 322 in the support arm, and sizing the vertical and lateral adjustment assemblies so they have significant surface area in contact with the splitter, allows the support arm to be attached or mounted to the splitter without any significant side-to side play in the support arm and shroud.

As stated, blade guard assembly 50 includes a vertical adjustment mechanism 400 and a lateral guide mechanism 670. Both mechanism are dual purpose. The vertical adjustment mechanism also serves to attach the assembly to the splitter. The lateral guide mechanism also functions as a vertical limit stop for the motion of the assembly.

The lateral guide mechanism 670 maintains the lateral alignment of the support arm 54, and therefore shroud 52, relative to splitter 26, and it serves to limit the vertical rotation of support arm 54 relative to the splitter. All of the presently disclosed embodiments use a groove with retaining surfaces, where the groove fits over and around lateral adjustment surface 522 on splitter 26 (labeled in FIG. 56). Each embodiment is attached to support arm 54 by a bolt, which passes through a washer, hole 332 in tab 330 in the support arm, the guide mechanism, a threaded bushing or nut, and hole 336 in tab 334 in the support arm. Thus, the groove is held in a fixed position laterally relative to the support arm, and when the groove fits over and around the lateral adjustment surface on the splitter, it holds the support arm in a fixed position laterally relative to the splitter. It will be appreciated that a deeper groove (i.e. one with taller side walls) will provide greater stabilization, since it will restrict the movement of the support arm more effectively. In some of the disclosed embodiments, the lateral position of the support arm can be adjusted by changing the position of the groove relative to the splitter. It is advantageous to provide adjustment of up to about 5 mm using the lateral guide mechanism. A relatively small angular change at the rear of the blade guard assembly will cause a much larger change at the nose of the shroud, so a significant amount of adjustment with the lateral guide is not necessary. In all of the presently disclosed embodiments, the lateral guide mechanisms are made from plastic, such as glass filled nylon, but it will appreciated that other materials, such as metal or ceramic, could be used.

FIGS. 58 through 64 show a first exemplary embodiment of a lateral guide mechanism 670, which is indexably adjustable. It can be seen in FIGS. 58 and 64 that the mechanism comprises a bolt 672, which passes through a washer 674, hole 332 in support arm 54, a sleeve 676 which is positioned adjacent to, and fits over a portion of, a guide 678, the guide 678, a threaded bushing 680, and hole 336 in the support arm. Guide 678 is shown isolated in FIGS.

Figure 59:
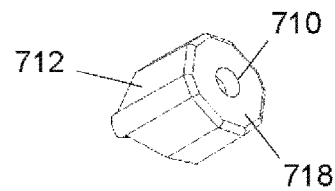
FIG. 59 shows a sleeve.
Figure 60:
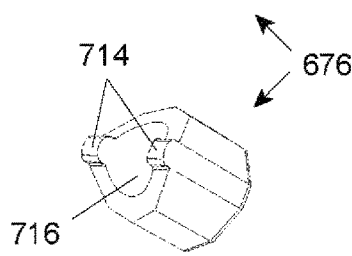
FIG. 60 shows another view of the sleeve of FIG. 59.
Figure 61:
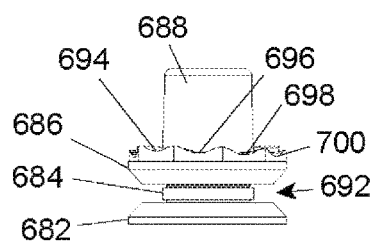
FIG. 61 shows a guide.
Figure 62:
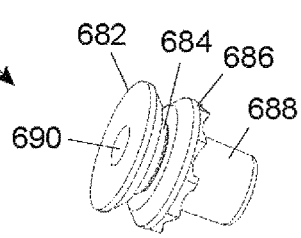
FIG. 62 shows a perspective view of the guide of FIG. 61.
Figure 63:
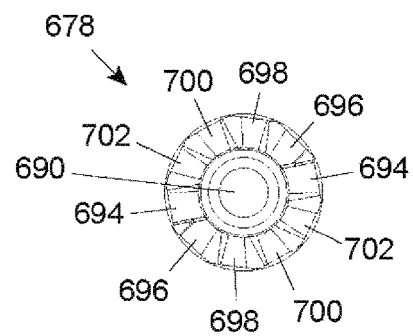
FIG. 63 shows another view of the guide of FIG. 61.
Figure 64:
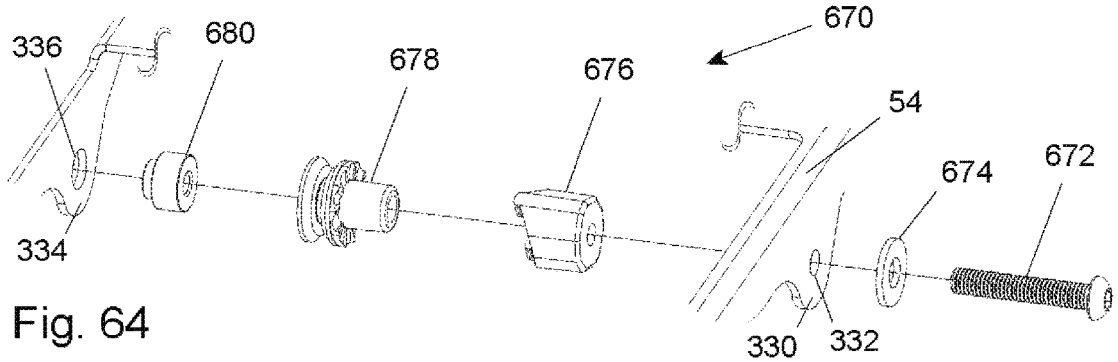
FIG. 64 shows a sectional, exploded view of the lateral adjustment mechanism of FIG. 58.

61-63, and it includes a larger diameter cylindrical section 682, a smaller diameter cylindrical section 684, a larger diameter cylindrical section 686, and a smaller diameter, long cylindrical section 688. A hole 690 passes through the center of the guide. Sections 682, 684, and 686 define a groove 692, which fits over lateral adjustment surface 522 on splitter 26. The inside-facing surfaces of sections 682 and 686 are guide surfaces which prevent support arm 54 from moving laterally relative to splitter 26, since groove 692 is configured to fit closely around the splitter. Cylindrical section 686 includes 5 pairs of stepped surfaces 694, 696, 698, 700, and 702, which are labeled in FIGS. 61 and 63. The pairs of steps change in height about 1 mm between the shortest and highest steps, which therefore provides about 1 mm of lateral adjustment spaced over 5 increments. Accordingly, the steps may be thought of as an index or indices to allow a user to adjust the support arm to a defined position. It will be appreciated that more or less total adjustment could be obtained by varying the overall change in height of the steps, and the number of indices could be changed to provide any desired precision of adjustment. Sleeve 676, shown isolated in FIGS. 59 and 60, is shaped generally like a hollow cylinder, with one end 718 closed except for a hole 710 disposed in the center, the other end open, forming a hole 716 configured to fit around section 688 on guide 678. The exterior of the sleeve includes a plurality of flat surfaces, such as surface 712, which allow the sleeve to be grasped and turned, much like a nut. It will be appreciated that the outer edges of the guide and sleeve could be provided with marks such as lines or indentations to provide a clear visual indication to a user of the position of the components relative to one another. The sleeve includes a pair of projections 714 which are positioned on opposite edges of the sleeve and are configured to contact the pairs of stepped surfaces on guide 678. In order to adjust the position of the support arm relative to the splitter, a user would loosen bushing 680 and then turn sleeve 676 to position projections 714 on a different pair of stepped surfaces. This would change the distance between the end 718 of sleeve 676, which rests against tab 330 in support arm 54, and groove 692, which fits around splitter 26, thus moving the support arm relative to the splitter. The user would then retighten bushing 680, which would lock the guide mechanism in place. It can be seen in FIG. 61 that the stepped surfaces 694-702 are each generally arcuate or concave in shape, which prevents projections 714 from slipping between the surfaces and provides a tactile indication to a user that the projections 714 are properly positioned. In use, lateral guide mechanism 670 does not rotate or move relative to the support arm; it slides up and down along lateral adjustment surface 522 on splitter 26. Since the mechanism, and therefore guide 678, does not rotate relative to splitter 26 during normal use, if the portion of groove 692 contacting the splitter became worn, a user could loosen bushing 680, rotate the entire adjustment mechanism to a new portion of groove 692, and retighten the bolt. This provides a 360-degree wear surface, which increases the lifespan of the component.

In a second exemplary embodiment, shown in FIGS. 65-68, a lateral guide mechanism 730 is comprised of a guide wheel 738 and an axle 736. In this embodiment, the guide is not adjustable relative to the splitter; the guide just functions to limit the movement of the support arm relative to the splitter. Guide wheel 738 is shown isolated in FIG. 67, and it includes two larger diameter cylindrical sections 744 and 750, with a small cylindrical section 748 disposed there-between. A groove 752 is defined by these sections, and the groove fits around lateral guide surface 522 on the splitter, as discussed above. The exterior face of section 744 includes a circular indentation 746 (labeled in FIG. 68). A hole 754 extends through the center of the wheel. Axle 736 is positioned adjacent to and within guide wheel 738, and it includes a smaller cylindrical section 766, which fits within hole 754 in the guide wheel. A shoulder 762 separates the smaller cylindrical section 766 from a larger cylindrical section 760. A short projection 764 extends around the perimeter of the shoulder. Projection 764 fits within indentation 746 when the axle is installed in the wheel, and prevents the wheel from being installed backwards on the axle. Section 766 extends very slightly beyond the end of guide wheel 738 when installed therein. When the guide mechanism is in use, a threaded bushing 740 is used to secure the axle 736 up against tab 330 in support arm 54, so the end 770 of larger cylindrical section 760 is pressed against the tab, and the end 772 of smaller cylindrical section 766 is pressed against the threaded bushing, as shown in FIG. 65. This prevents the axle from rotating relative to the support arm. However, since the axle extends slightly beyond the guide wheel, the wheel is not trapped between the support arm and the shoulder, so the guide wheel is free to rotate about the axle as the guide wheel moves up and down along lateral adjustment surface 522 on splitter 26. This design is cheap to manufacture, and it accommodates manufacturing tolerances in the splitter, since it can roll over potential imperfections in the splitter instead of catching on them. It will be appreciated that axle 736 and guide wheel 738 could also be formed as a single component, so groove 752 did not roll or rotate along the edge of the splitter as the support arm moved up and down, but instead slid along surface 522. This design would be very simple and cheap to manufacture while also providing the 360-degree wear surface discussed above.

Figure 69:
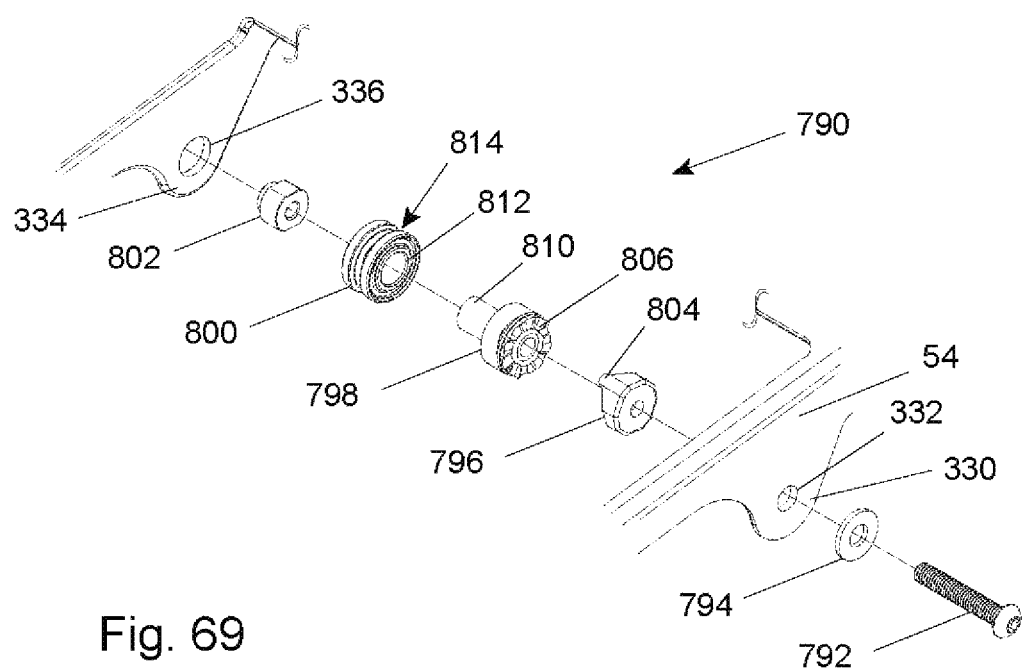
FIG. 69 shows a sectional, exploded view of another alternate lateral adjustment mechanism.

A third exemplary lateral guide mechanism 790, shown in FIG. 69, includes features from the two embodiments disclosed above: it is indexably adjustable, and it includes a guide wheel which is adapted to roll along the splitter. It also includes a sleeve 796, which is shaped like sleeve 676 discussed above, except it is shorter in length than sleeve 676. This is because sleeve 796 does not fit around an axle, like sleeve 676, but instead only interacts with a toothed section 806 on an adjustment axle 798. A bolt 792 passes through a washer 794 and then through hole 332 in support arm 54, then through sleeve 796 and adjustment axle 798. Sleeve 796 includes projections 804, similar to projections 714 on sleeve 676, and those projections are configured to engage corresponding pairs of stepped surfaces on section 806 of adjustment axle 798, which are similar to the stepped surfaces on guide 678. The other end of adjustment axle 798 includes an axle section 810, which fits within an opening 812 in a guide wheel 800, leaving wheel 800 and its groove 814 to roll freely along splitter 26 when the blade guard assembly is installed on the splitter, as with guide wheel 738 discussed above. A bolt 792 extends through the entire guide mechanism and is secured with a threaded bushing 802, similarly to the embodiments discussed above.

Figure 70:
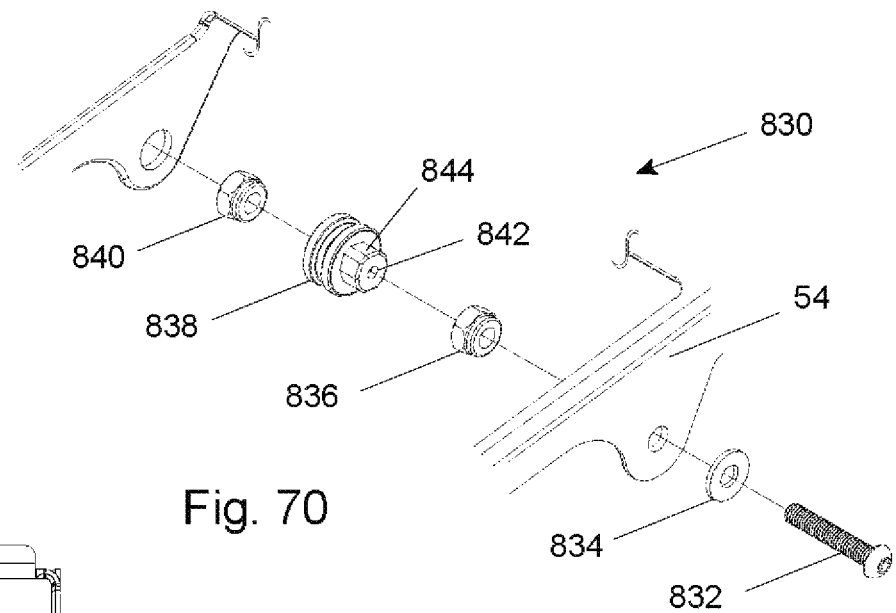
FIG. 70 shows a sectional, exploded view of yet another alternate lateral adjustment mechanism.
Figure 71:
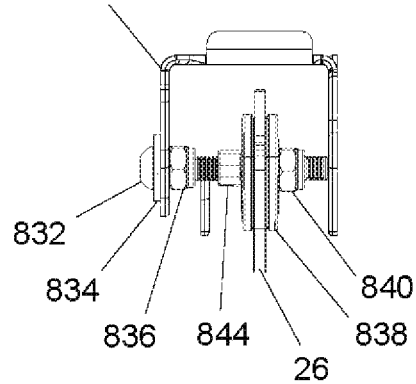
FIG. 71 shows a side front view of the lateral adjustment mechanism of FIG. 70 installed on a splitter.

A fourth exemplary lateral guide mechanism 830, shown in FIGS. 70 and 71, uses a threaded guide 838. The threaded guide is shaped similarly to wheel 744, but the hole 842 in the center is threaded, and the guide does not rotate relative to support arm 54 during normal use. Threaded guide 838 also includes a section 844 which is shaped generally like a nut, and which is configured to be used to turn the threaded guide. A bolt 832 passes through a washer 834, then through support arm 54, a nut 836, hole 842 in guide 838, a self-locking nut 840 (such as a nylon insert lock nut), and support arm 54. Nut 836 is tightened against support arm 54, and it secures bolt 832 to the support arm, so the bolt does not turn or move relative to the support arm. Nut 840 is tightened against threaded guide 838, and the interaction between nut 840 and nut section 844 prevents the threaded guide from rotating during use as it moves up and down along splitter 26. To adjust the guide relative to the splitter, a user would use a wrench to loosen nut 840 and guide 838, rotate threaded guide 838, causing it to move laterally along bolt 832 to the desired position, and then tighten nut 840 up against the guide.

It will be appreciated by one of ordinary skill in the art that the features of the various embodiments of a lateral guide mechanism described above could be combined in a variety of ways without departing from the scope of the presently disclosed invention. Additionally, the lateral guide mechanism could be secured to support arm 54 in a variety of ways, such as a welded pin. Support arm 54 could also be provided with a slot configured to fit around the extension 520, instead of opening 308, in which case the extension itself would be the lateral guide mechanism.

As stated, the lateral guide mechanism also functions as a limit stop for the pivotal motion of support arm 54 relative to splitter 26. The function of lateral guide mechanism 730 will be described for illustrative purposes, but it will be appreciated that this part of the disclosure could apply to any of the disclosed embodiments of the lateral guide mechanism. The splitter includes an extension 520, which extends up and towards the front of the splitter. When viewed from the side, as in FIG. 56, the extension extends up and then forward. The front of the of the vertical section of the extension is the lateral adjustment surface 522 discussed above, and it can be seen in at least FIG. 56 that the surface is slightly arcuate in shape. This curve accommodates the slight forward and backward movement of the guide wheel, such as guide wheel 738, as it travels up and down when the support arm is pivoted about its attachment point at the rear of the splitter. The movement of the components attached to support arm 54 is generally arcuate, and centered about eccentric leveling bushing 406, the position of which does not move significantly within cutout 508 during normal use. Thus, as the support arm is pivoted up and down, the lateral guide mechanism, such as mechanism 730, moves slightly forward and backward, along a section of a circle, the radius of which is defined by the distance between vertical adjustment mechanism 400 and lateral guide mechanism 730, which, in turn, is defined by the distance between the tabs on the support arm.

Thus, the movement of support arm 54 is controlled by lateral adjustment surface 522 and vertical adjustment surfaces 510. It is advantageous to bias the lateral guide mechanism to always be in contact with lateral guide surface 522 on the splitter. If the guide mechanism is not securely in contact with the guide surface, it can decrease the lateral stability of the blade guard assembly, and could potentially move so the grooved portion of the mechanism was offset from the lateral guide surface. So, is important to have lateral guide mechanism 730 not move forward and backward relative to lateral guide surface 522. The arcuate shape of lateral adjustment surface 522 allows the groove 752 in wheel 738 to remain a constant distance away from the surface while the support arm is pivoted up and down about vertical adjustment mechanism 400. Therefore, it is necessary to allow the vertical adjustment mechanism to move forward and backward slightly in cutout 508 as the eccentric leveling bushing is turned, since the position of the lateral guide mechanism relative to surface 522 must remain constant.

As discussed previously, eccentric leveling bushing 406 is rotated to adjust the position of the rear end of support arm 54, which in turn affects the vertical range of motion of blade guard assembly 50. Vertical adjustment mechanism 400 and lateral guide mechanism 730 are both attached to support arm 54. Therefore, bolt 402 in vertical adjustment mechanism 400 is at a fixed distance relative to bolt 732 in lateral guide mechanism 730. When eccentric leveling bushing 400 is rotated between the two positions shown in FIG. 51, bolt 402 in hole 342 in the bushing follows a slightly arcuate path. This motion occurs because support arm 54 essentially pivots like a teeter-totter, with lateral guide mechanism 730 as the pivot point. Lateral guide mechanism 730 is held against lateral adjustment surface 522 on splitter 26 by spring 410, as stated. Groove 434 in eccentric leveling bushing 406 is at a fixed height within cutout 508 in the splitter, since it is held between surfaces 510 in the cutout. Therefore, as the bushing is rotated, and bolt 402 moves along its slight arcuate path, section 422 in the bushing moves slightly forward and backward within cutout 508, since the bushing is not held against the rear edge of the cutout. This is what allows lateral guide mechanism 730 to remain in contact with lateral adjustment surface 522, since it is held in place by spring 410, and bushing 406 does not push the guide mechanism forward and out of place as the bushing is rotated.

At the base of the of extension 520, splitter 26 includes a lower limit stop surface 526, which is at the rearmost end of upper edge 504. The bottom edge of the forwardly extending section of extension 520 defines an upper limit stop surface 524. The lateral guide mechanism (and therefore support arm 54) move freely up and down along lateral adjustment surface 522 until the groove in the guide contacts one of the limit stop surfaces. The limit stop surfaces define what may be thought of as uppermost and lowermost positions of support arm 54. These surfaces limit the range of vertical movement of of the support arm and prevent the support arm and shroud from moving too far down (such as, if the shroud was down when the table insert was removed, the shroud could fall into the hole) or too far up (which could allow a workpiece greater than the maximum safe height to be advanced toward the blade, as will be discussed). The locations of the upper and lower limit stop surfaces are not adjustable, so the eccentric leveling bushing 406 is used to adjust the range of vertical motion of the support arm, as will be discussed.

As discussed previously, eccentric leveling bushing 406 is used to attach support arm 54 to splitter 26 and to adjust the range of vertical motion of the support arm. When blade guard assembly 50 is installed on splitter 26, guide wheel 738 in lateral guide mechanism 730 is held against lateral adjustment surface 522 on splitter 26, and eccentric bushing 406 is held within cutout 508 in the splitter, able to move forward and backward slightly, but confined vertically by surfaces 510, as discussed above. The support arm 54 is configured to pivot about narrow cylindrical section 422 in groove 434 in bushing 406. This causes guide 730 to move up and down along an arcuate path defining a circle centered around the center of the narrow cylindrical section 422 in the eccentric bushing, as stated. This distinction is important; the support arm does not rotate about bolt 402 in the vertical adjustment mechanism. It rotates about the narrow section 422 in the eccentric bushing, which, as stated, is offset from bolt 402. In other words, since bolt 402 is not centered in section 422 in the eccentric bushing, and since the bushing and bolt do not rotate relative to the support arm during use, the support arm rotates about the section 422 in the bushing when it is installed in splitter 26.

As discussed above, turning eccentric bushing 406 causes the vertical position of bolt hole 432 (and thus bolt 402) to change. This can be seen in at least FIG. 51. However, since bolt 402 connects the rear end of support arm 54 to bushing 406, changing the height of bolt 402 causes the rear end of support arm 54 to move up and down. This is shown in at least FIGS. 43 and 44, which show bushing 406, and therefore support arm 54, adjusted to high and low configurations with the support arm raised to its maximum height. When blade guard assembly 50 is installed in saw 10, lateral guide mechanism 730 does not normally contact surface 526 on splitter 26; when shroud 52 rests on the work surface, it holds support arm 54 and mechanism 730 in a position just above surface 526. Using the work surface of the saw as the lower limit stop of the blade guard assembly, instead of surface 526 on the splitter, when the assembly is installed on the saw helps to bias the guard assembly to always be able to lower down and contact the work surface when it is not in use.

It is advantageous to be able to limit the maximum vertical position of the blade guard assembly, so the presently disclosed assembly is provided with an integral, and adjustable, wood stop. Thus, the adjustment provided by eccentric leveling bushing must be discussed with the support arm 54 fully raised, because the maximum height of the front end of the support arm defines the height of nose 100 of shroud 52, and thus the maximum height of a work piece that can be advanced toward the blade. The interaction between the lateral guide mechanism 730 against surface 524 on the splitter and the orientation of bushing 406 (and therefore the height of the rear end of support arm 54) can be thought of much like a teeter-totter: if guide mechanism 730 remains in contact with surface 524, raising the rear end of support arm 54 will lower the front of the arm, and therefore lower the nose of the shroud. Conversely, lowering the rear end of support arm 54 will raise the front of the arm, and therefore raise the nose of the shroud.

FIG. 43 shows the low configuration of eccentric leveling bushing 406 and support arm 54 (and therefore blade guard assembly 50), wherein shroud 52 is at the lowest point of its maximum height adjustment. It can be seen that support arm 54 slopes downward from the rear of the arm to the front. In this position, eccentric leveling busing 406 is positioned so that surface 444, which may be thought of as a first adjustment surface, contacts the top of horizontal section 346 of tab 344 in support arm 54, which may be thought of as a first stop surface. FIG. 44 shows what may be thought of as the high position or uppermost position of support arm 54 (and thus blade guard assembly 50). The figure shows eccentric bushing 406 rotated so surface 442 on the bushing, which may be thought of as a second adjustment surface, contacts the bottom of horizontal section 340, which may be thought of as a second stop surface. It can be seen in that support arm 54 slopes upward from the rear of the arm to the front of the arm.

Thus, as eccentric leveling bushing 406 is rotated, the front of support arm 54 changes in height. It will be appreciated that, due to the length of support arm 54, only a small amount of adjustment is needed at the rear of the arm, in order to make a relatively substantial change in height at the front of the support arm. In the presently disclosed embodiment, eccentric leveling bushing 406 provides about 3.25-degrees of adjustment, which provides about 10 mm of adjustment for the front of support arm 54 and, therefore, shroud 52. It is advantageous to be able to adjust the range of motion of the support arm in order to accommodate manufacturing tolerances and to adjust the height to which the shroud will raise to accommodate a work piece. This allows a user to control the maximum workpiece height which can be advanced toward the blade, thus preventing a work piece which is too tall, or greater than a predetermined thickness (i.e. 3 or 3.25 inches), to from being placed into contact with the blade.

Figure 72:
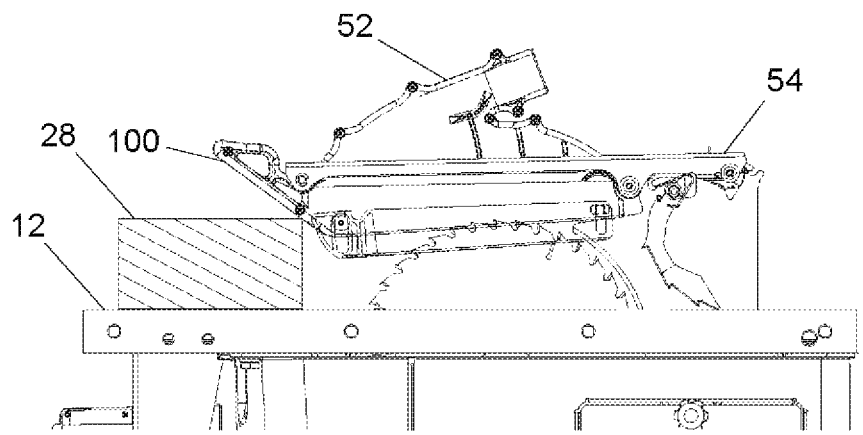
FIG. 72 shows a side view of a blade guard and a work piece.

Blade guards, such as the one described in U.S. Pat. No. 9,586,335, titled Blade Guard With Dust Collection, which is incorporated herein by reference, can include a wood stop, which is a component used to prevent a work piece greater than a maximum cutting height from being advanced towards the blade. However, such components are often removed by a user and not reinstalled. It is an advantage of the presently disclosed invention that blade guard assembly 50 includes an integral wood stop, since the blade guard itself is a wood stop. As discussed above, when a work piece is advanced toward the shroud, it contacts surface 104 on nose 100, which normally causes the shroud to raise and rest on top of the work piece as it is advanced toward, and past, the blade. However, a work piece which is greater than a chosen height (i.e. 3 inches), will not slide under nose 100, and this will cause the shroud to raise or pop up, thus pushing the nose down against the work piece. This can be seen in FIG. 72, which depicts what may be thought of as an upper position of the blade guard assembly. While the shroud could be designed to remain in place should a work piece that is too tall be brought into contact with the nose, having the shroud pop up provides a clear visual indication to the user that the work piece is too tall. The amount of force required to pop up the shroud is determined by the location of the contact point between the work piece relative to the pivot point of the shroud (clevis pin 310). The movement is based on leverage, and a longer lever arm requires less force to achieve the same movement. It is advantageous to have the required force be high enough that the shroud does not pop up too easily, but low enough that a user is not applying enough force to slip or otherwise cause the work piece or shroud to shift unexpectedly. The position of the bottom surface 106 relative to the pivot point of pin 310, which sets the angle of nose 100, can be chosen to yield a desired force for the wood stop. The further back bottom surface 106 is relative to pin 310, the longer the lever arm is, and therefore less force is required to raise the rear end of the shroud.

Several factors must be considered when choosing the position of bottom surface 106. First, it is important that a user be able to make full-depth cuts with the saw. However, it is important for safety that a user not be able to make cuts greater than full-depth with the splitter and blade guard assembly installed in the saw, since the work piece could be advanced only until it contacted the splitter and anti-kickback pawls, and then it would get stuck and potentially create a safety hazard. Thus, it is an advantageous feature to provide an indication that a work piece is too tall, well before it comes into contact with the blade. Finally, it is desirable to not require a user to push too hard on a work piece to obtain that indication. The presently disclosed wood stop may be thought of as a "hard stop" since it not only provides a visual indication of a work piece being too tall, but it also physically prevents said work piece from being advanced toward the blade. When the shroud pops up, it does so until tabs 126 contact support arm 54, which also moves up, until lateral adjustment mechanism 730 contacts surface 524 on splitter 26. In this configuration, the blade guard assembly becomes rigid, since both pivot points are at the limits of their travel. This allows the assembly to withstand significant pressure without moving, which prevents a user from inadvertently bypassing the wood stop by forcing the workpiece under the guard. In an alternate embodiment, the wood stop could be configured to be a "soft stop," wherein the nose 100 would pivot down and bind against a too-tall work piece. This could be achieved by positioning contact point 106 in front of pin 310, which would over-center the shroud. However, this embodiment would be less consistent, because it is difficult to predict at exactly what point the guard will bind against the work piece, due to differences in work piece height, and the guard could potentially bind on work pieces that were within the acceptable cutting height.

As a work piece is moved towards the blade with the shroud in place, the work piece first encounters the nose 100 of the shroud. As discussed above, the nose 100 is shaped in such a way that the work piece can easily slide under the nose and raise the shroud and support arm as it slides under. The work piece contacts the shroud somewhere along contact surface 104, depending on the exact height of the work piece. During normal use, as the work piece is advanced toward the blade, contact surface 104 rides up along the edge of the work piece, with the contact surface functioning as a ramp. The front of the shroud raises up as the work piece is advanced, and this allows side extension 60 to pivot down, out of shroud 52, so flange 186 on the side extension briefly remains in contact with the work surface after the shroud has begun to rise up. The support arm pivots with the front of the shroud, so the lateral guide mechanism rides up along extension 520 on the splitter as the nose 100 and the attached front end of support arm are raised up. However, as the work piece is advanced further toward the blade and along contact surface 104 it contacts front edge 178 of side extension 60 and pushes the extension back into the shroud. The work piece then contacts the bottom surface 106 of the shroud and rides along that surface. As the work piece contacts the blade, and is advanced to about the halfway along the shroud, the shroud remains generally horizontal. The support arm remains generally stationary during this, since the nose of the shroud remains generally stationary. In this position, the blade guard assembly may be thought of as being in a deflected position, since it is deflected up from the work surface by the work piece. However, the blade guard assembly is designed to bias the nose 100 down, so as soon as the work piece passes beyond the center of gravity of the support arm and shroud, nose 100 pivots back down until the corner between surfaces 104 and 106 contacts the work surface, in order to protect the user and provide maximum coverage of the blade. In this position, corner 172 of side extension 60 is also in contact with the work surface, and flange 186 rests on the work piece, so side extension 60 remains within the shroud. The front end of the support arm pivots back down along with the nose of the shroud as the nose 100 lowers down. As the work piece is advanced further, so only the very rear edges of the shroud rest on the work piece, side extension 60 is free to pivot back down to contact the work surface. When the work piece is advanced further, and thus brought out of contact with the shroud, the shroud pivots back down until it rests flat on the work surface, so blade guard assembly 50 is once again in its nominal operating position.

Blade guard assembly 50 is also equipped with a set of anti-kickback pawls, as shown in at least FIGS. 5 and 43. The anti-kickback pawls are mounted to the splitter in such a way that they are able to pivot. As a work piece is moved forward past the blade, it encounters the anti-kickback pawls which, under normal conditions, pivot up when pushed back to allow the work piece to slide easily underneath. The anti-kickback pawls gently ride on top of the work piece as the work piece moves past. Once the work piece passes the anti-kickback pawls, springs work to pull the anti-kickback pawls forward again to their original position. However, in a kickback situation where the blade kicks the work piece back toward the user, often with some force, the pawls, under cam action, pinch the work piece between the table and the sharp pointed tips along the bottom edge of the anti-kickback pawls and the sharp tips dig into the work piece to prevent the work piece from being propelled toward the front of the blade and the user.

Anti-kickback pawls such as those shown in the presently disclosed intention, are described in U.S. Pat. No. 9,586,335, titled Blade Guard With Dust Collection, which is incorporated herein by reference. An exploded view of anti-kickback assembly 950 is shown in FIG. 7. The assembly is comprised of two anti-kickback pawls 956 held together by a spring 958 and a bolt 952, which passes through a washer 954 and then through a specially designed bushing 960 which also serves as a standoff. On the other side of the bushing, bolt 952 passes through another washer 954 and then threads into a nut 962.

As shown in at least FIGS. 5 and 43, anti-kickback assembly 950 is attached to the top, middle of splitter 26 by spring 958 and bolt 952. Splitter 26 includes an extension 546 and a notch 544 (labeled in FIG. 56). The looped middle of spring 958 hooks around and over extension 546 so that the loop fits in notch 544, as shown in FIG. 43. Splitter 26 also includes a cutout 540 immediately rearward of extension 546, and the cutout includes a front edge 542. Bushing 960 in anti-kickback assembly 950 fits into cutout 540 in the splitter so that a groove in the bushing fits over the edge of the splitter along front edge 542. The distance between notch 544 and edge 542 causes spring 958 to stretch, and the tension in the spring holds the anti-kickback assembly on the splitter.

Sometimes a work piece may be soft or have a surface prone to scratching, or the anti-kickback pawls may be biased down with enough force to scratch or leave visible impressions on the surface of the work piece. If the anti-kickback pawls cannot be easily removed and re-installed, the user might be less likely to use them. To address this situation, the presently disclosed anti-kickback pawls are designed in such a way that they can be easily removed and re-installed without the use of tools and without the user having to manipulate a bail or lever.

Anti-kickback assembly 950 and shroud 52 can be installed on splitter 26 independently of one another, allowing the use of just one component when needed. To remove the anti-kickback assembly, the user first pivots the blade guard assembly up away from the splitter or removes the assembly from the splitter. This provides access to the anti-kickback assembly, and a user then holds both sides of bolt 952 and pulls the bolt back, thus stretching spring 958 until the bolt clears cutout 540 in the splitter. Splitter 26 includes an extension 528 defining a rearward edge of cutout 540. Extension 528 helps direct the movement of the anti-kickback assembly as it is being removed or installed.

To re-install the anti-kickback assembly, the loop in spring 958 is fitted over extension 546 on splitter 26 and bushing 960 is positioned over the top edge of the splitter. Bolt 952 is then pulled back, stretching spring 958, and moved into cutout 540 and toward front edge 542. The top and bottom edges of extension 546 and cutout 540 are rounded to facilitate movement of the bushing into and out of the cutout. The bolt is then released and spring 958 pulls the bolt forward toward edge 542 and the remaining tension in the spring holds the anti-kickback assembly in place.

In normal operation, spring 958 pulls the anti-kickback pawls down and forward until the front edge of each anti-kickback pawl 956 contacts a pawl-stop 550 on the splitter. When a piece of wood, or other work piece, passes under the shroud, the anti-kickback pawls rotate up and back about bolt 952 so that the edges of the pawls ride gently on the surface of the work piece. As the anti-kickback pawls rotate back, the top of the spring 958 pivots upwards about notch 544 and towards the front of the shroud as spring 958 is stretched. Opening 324 in support arm 54 provides clearance for the top of the spring as the anti-kickback pawls move.

It can be seen in at least FIGS. 4 and 15 that contours 144 and 148 (labeled in FIG. 16) are angled down along the shroud, moving from the front to the rear of the shroud. And, as discussed, side extension 60 changes in height along its length in order to accommodate the change in height of contours 144 and 148 (which define the transition between wide section 90 and narrow section 92 of cavity 86). When the blade is fully lowered, or a work piece fully raises the shroud, as shown in FIG. 4, anti-kickback assembly 950 pivots back until it fits generally in an arc around vertical adjustment assembly 400. The position of cutout 508 in splitter 26, which holds vertical adjustment assembly 400, must be high enough to provide clearance for the anti-kickback pawls when they are fully rotated up. However, it is advantageous to minimize the overall height of the splitter, because a taller splitter will be more likely to deflect or bend. If the shroud was designed so contours 144 and 148 were level across the length of the guard (i.e. so support arm 54 would be level in FIG. 4), the connections between the support arm, anti-kickback assembly, and splitter would have to be raised, which would make the splitter taller, which in turn would decrease the stability thereof because any lateral force on the top of the splitter would have a much longer leverage arm.

Alternatively, the front ends of the contours (and therefore support arm 54) could be lowered, but this is also not advantageous. When the blade and blade guard assembly are tiled to 45-degrees (as shown in FIG. 41), it is desirable to at least substantially cover the exposed side of the blade with right shell 56 and side extension 60. In the presently shown embodiment, with the slight overlap between the extension and the guard, the blade is at least substantially covered when it and the guard assembly are tilted to 45-degrees at full elevation. However, if the front ends of the contours were lowered, without changing the overall width of the blade guard, the coverage provided by the right shell and side guard would not be sufficient to cover the blade, since the height of both components would decrease. This limitation only applies, however, if the width of the blade guard is not changed. If the blade guard is made to be entirely the width of wide section 90, so support arm 54 would extend out beyond the footprint of the guard, then the extension could be formed to be any height within the blade guard.

In the presently disclosed embodiment of blade guard assembly 50, the connection between shroud 52 and support arm 54, as well as the connections of the vertical adjustment assembly, lateral guide assembly to the support arm, are all indexed off of right side 318 of the support arm, as can be seen in at least FIGS. 7, 35, 37, and 38. As discussed, shroud 52 is connected to support arm 54 by a clevis pin 310 and e-clip 312. Since the head of the bolt is captured by a boss in the left shell, the overall position of the shroud relative to the support arm is dictated by tab 302 in the support arm, which is sandwiched between right shell 58 and e-clip 312. The position of lateral guide assembly 730 is controlled by tab 330 in the support arm, which is sandwiched between axle 736 and the head of bolt 732 (with washer 734 disposed therebetween to effectively enlarge the head of the bolt, and thereby further stabilize the assembly). Tab 342 in support arm 54 defines the position of vertical adjustment assembly 400, since the tab is sandwiched between eccentric leveling bushing 406 and the head of bolt 402 (along with washer 404). The head of bolt 310, and threaded bushings 408 and 740, are all merely supported by tabs 304, 334, and 360 in the left side of the support arm; the left side helps to prevent the bolts 310, 402, and 732 from moving out of perpendicularity with support arm 54. Thus, in an alternate exemplary embodiment, support arm 54 could be formed without left side 320.

Figure 73:
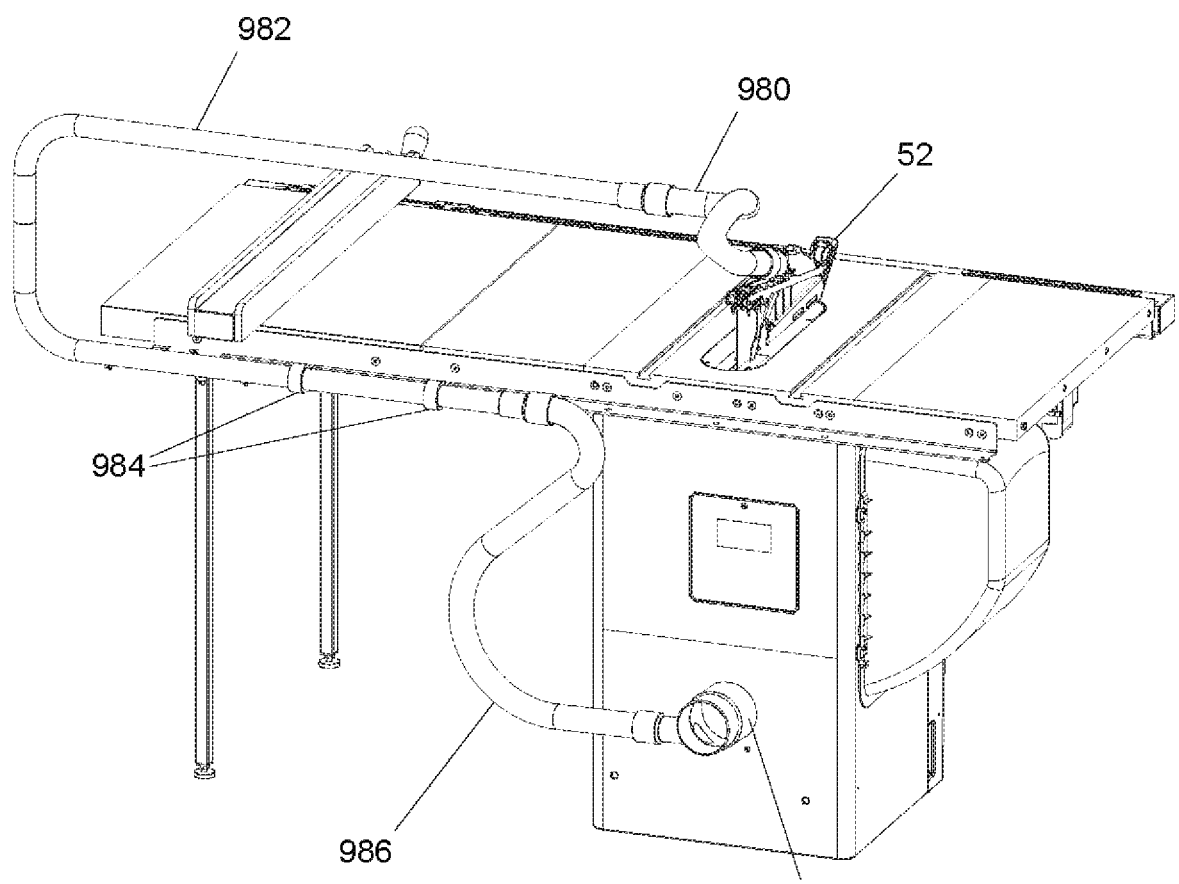
FIG. 73 shows a blade guard connected to a dust collection hose and a conduit.

FIG. 73 shows shroud 52 connected to a flexible hose 980, which in turn, is connected to a conduit 982 that extends above the saw to provide clearance for work pieces pushed past the blade. In the depicted embodiment, conduit 982 is a bent, rigid metal pipe. The conduit is supported by mounts 984, which attach to the saw or to a rail along the back of an extension table attached to the saw. A second hose 986 connects conduit 982 to a dust collection port 988 on table saw 10, which in turn can be connected to a vacuum or some other dust collection system.

FIG. 74 shows an internal view of a table saw, with some components removed for clarity. FIG. 74 shows a riving knife 22 positioned adjacent blade 20. In this embodiment, riving knife 22 is positioned or held in place by a mount 23. Of course, as discussed above, mount 23 could also hold a splitter 26, as shown in FIG. 2.

INDUSTRIAL APPLICABILITY

The power saws described herein are applicable to woodworking, manufacturing, packaging, construction, carpentry, material processing, etc. Various disclosed features are particularly relevant to table saws. Various other disclosed features are particularly relevant to table saws, hand-held circular saws, track saws, miter saws, and band saws with active injury mitigation technology.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A table saw, comprising:
   a table having a work surface with an infeed region;
   a rotatable, nominally planar, circular blade configured to extend at least partially above the work surface to cut a work piece on the work surface as the work piece is moved into contact with the blade while the blade is rotating, wherein the blade has opposed sides;
   a motor to drive rotation of the blade;
   a splitter;
   a mounting mechanism configured to position the splitter adjacent the blade;
   a blade guard assembly extending from the splitter generally toward the infeed region of the work surface;
   wherein the blade guard assembly includes a support member that extends generally above the blade and which is pivotally connected to the splitter for movement between an uppermost position and a lowermost position relative to the work surface;
   wherein in the blade guard assembly further includes a shroud which projects from the support member toward the work surface to at least partially obstruct contact with the blade by a user, wherein at least a part of the shroud extends adjacent a side of the blade, and wherein the shroud is pivotally connected to the support member for movement between a first position and a second position;
   wherein movements of the support member and the shroud are responsive to engagement of the shroud by a work piece on the work surface; and
   wherein the shroud acts as a stop to block a work piece having at least a predetermined thickness from moving into contact with the blade when the support member is in the uppermost position and the shroud is in the second position.

2. The table saw of claim 1, where the blade has a radius, and further where the movement of the support member between the uppermost position and the lowermost position spans a distance less than 50% of the radius of the blade.

3. The table saw of claim 1, where the blade is configured to extend a maximum height above the work surface, and further where the movement of the support member between the uppermost position and the lowermost position spans a distance less than the maximum height of the blade above the work surface.

4. The table saw of claim 1, where the blade is configured to extend a maximum height above the work surface, and further where the movement of the support member between the uppermost position and the lowermost position spans a distance less than 10 mm greater than the maximum height of the blade above the work surface.

5. The table saw of claim 4, where the movement of the support member between the uppermost position and the lowermost position spans a distance less than 10 mm below the maximum height of the blade above the work surface.

6. A table saw, comprising:
   a table having a work surface with an infeed region;
   a rotatable, nominally planar, circular blade configured to extend at least partially above the work surface to cut a work piece on the work surface as the work piece is moved into contact with the blade while the blade is rotating, wherein the blade has a top;
   a motor to drive rotation of the blade;
   a splitter;
   a mounting mechanism configured to position the splitter adjacent the blade;
   a blade adjustment mechanism configured to change the orientation and elevation of the blade relative to the work surface;
   a blade guard assembly extending from the splitter generally toward the infeed region of the work surface;
   wherein the blade guard assembly includes a support member and a shroud, wherein the shroud and support member are configured for movement in a range of positions between a nominal position, in which the shroud extends generally toward the work surface relative to the splitter, and a deflected position, in which the shroud and support member are deflected away from the work surface relative to the nominal position;
   wherein the shroud is pivotally coupled to the support member;
   wherein the support member is pivotally coupled to the splitter;
   wherein the range of positions includes an upper position; and
   wherein the blade guard assembly includes a pivot stop that defines the upper position by blocking the movement of the support member and shroud away from the work surface; and
   wherein the shroud is restricted from pivoting relative to the support member beyond a position in which the bottom edge of the shroud is generally at the top of the blade when the blade guard assembly is in the upper position.

* * * * *